United States Patent
Bickham et al.

(10) Patent No.: US 10,126,495 B2
(45) Date of Patent: Nov. 13, 2018

(54) COATED LOW LOSS OPTICAL FIBER WITH SMALL DIAMETER

(71) Applicant: Corning Incorporated, Corning, NY (US)

(72) Inventors: Scott Robertson Bickham, Corning, NY (US); Ching-Kee Chien, Horseheads, NY (US); Ruchi Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/630,336

(22) Filed: Jun. 22, 2017

(65) Prior Publication Data

US 2018/0003890 A1    Jan. 4, 2018

Related U.S. Application Data

(60) Provisional application No. 62/356,089, filed on Jun. 29, 2016.

(51) Int. Cl.
   *G02B 6/028*   (2006.01)
   *G02B 6/02*    (2006.01)
   *G02B 6/036*   (2006.01)

(52) U.S. Cl.
   CPC ....... *G02B 6/0288* (2013.01); *G02B 6/02395* (2013.01); *G02B 6/0365* (2013.01); *G02B 6/03627* (2013.01)

(58) Field of Classification Search
   CPC .............. G02B 6/0288; G02B 6/03627; G02B 6/02395; G02B 6/0365
   See application file for complete search history.

(56) References Cited

U.S. PATENT DOCUMENTS 6,711,330 B1    3/2004   Donlagic
2013/0039626 A1*  2/2013   Bickham .............. G02B 6/0365
                                                            385/124

(Continued)

FOREIGN PATENT DOCUMENTS

WO    2013003016 A1    1/2013
WO    2013023113 A1    2/2013

(Continued)

OTHER PUBLICATIONS

International Searching Authority Invitation to Pay Additional Fees PCT/US2017/039623 dated Sep. 14, 2017.

(Continued)

*Primary Examiner* — Ellen Kim
(74) *Attorney, Agent, or Firm* — Kevin L. Bray

(57) ABSTRACT

A multi-purpose optical fiber with coating is provided. The optical fiber can function as a transmission fiber or as a coupling fiber for optical data links that features low coupling loss to silicon photonics lasers, VCSELs, single mode transmission fibers, multimode transmission fibers, and high speed receivers. The fiber includes a core, an optional inner cladding region, a depressed index cladding region, an outer cladding region, and a coating. The relative refractive index profile of the coupling fiber includes a small-radius core region with α profile and a depressed index cladding region that facilitates low bending loss and high bandwidth. The coating thickness and overall diameter of the fiber is small.

20 Claims, 9 Drawing Sheets

(56) References Cited

U.S. PATENT DOCUMENTS

| | | | |
|---|---|---|---|
| 2013/0243382 A1 | 9/2013 | Li et al. | |
| 2013/0322837 A1* | 12/2013 | Bickham | G02B 6/0288 385/124 |
| 2014/0328566 A1 | 11/2014 | Bickham et al. | |
| 2015/0086161 A1* | 3/2015 | Bickham | G02B 6/0288 385/31 |
| 2016/0116660 A1* | 4/2016 | Benjamin | G02B 6/02395 362/553 |
| 2016/0377801 A1 | 12/2016 | Bickham et al. | |

FOREIGN PATENT DOCUMENTS

| | | |
|---|---|---|
| WO | 2013066961 A1 | 5/2013 |
| WO | 2014057299 A1 | 4/2014 |
| WO | 2015126895 A1 | 8/2015 |
| WO | 2016038414 A1 | 3/2016 |
| WO | 2016200788 A2 | 12/2016 |

OTHER PUBLICATIONS

International Search Report and Written Opinion PCT/US2017/039623 dated Nov. 22, 2017.

Ishikawa et al., "High-density and Low-cost 10-Gbps×12ch Optical Modules for High-end Optical Interconnect Applications", OFC/NFOEC2008, OMK6, 3 Pgs.

Iwaya et al. "Development of optical wiring technology for optical interconnects" Furukawa Review, 41 (2012) pp. 1-5.

Mizuki Isaji et al., "Multi-Mode Fiber Ribbon Compatible with Standard Ribbon for High-Density Optical Interconnection", 56th IWCS 2007, pp. 149-153.

Sabano et al., "Development of a Multiple-Row MT Connector for 80 μm Diameter Optical Fibers," OFC 2009, Paper JThA87, 3 Pgs.

Suzuki et al, "Low-Cost and High-Density 10Gbps/ch Optical Parallel Link Module for Multi-Terabit Router Application", ECOC 2006, 2 Pgs.

\* cited by examiner

COATED LOW LOSS OPTICAL FIBER WITH SMALL DIAMETER

This application claims the benefit of priority under 35 U.S.C. § 119 of U.S. Provisional Application Ser. No. 62/356,089 filed on Jun. 29, 2016 the content of which is relied upon and incorporated herein by reference in its entirety.

FIELD

The present description pertains to optical fibers designed for efficient coupling to chips and devices used in silicon photonics. More specifically, this description pertains to multi-purpose optical fibers that feature low macrobending bending losses in tight bending configurations as well as efficient coupling to single mode and multimode light sources, waveguides, other fibers, and detectors used in the transmission and receiving of optical signals. Most specifically, this description relates to small diameter multi-purpose optical fibers with coatings that minimize microbending losses

BACKGROUND

The need for greater bandwidth and higher data transmission rates has motivated efforts to develop next-generation platforms for information storage and delivery. It is widely believed that optical information systems will provide superior performance to today's microelectronics-based systems. Integrated optical systems based on silicon photonics are a leading replacement technology for microelectronic systems. The silicon photonics platform interfaces with standard CMOS technologies and WDM (wavelength division multiplexing) to convert electrical signals to optical signals, transmit optical signals, and reconvert optical signals to electrical signals. In disaggregated systems, transfer of signals between units occurs through optical links that provide high modal bandwidth and high data transfer rates.

Low-loss coupling between optical fibers and transceivers is a key challenge for data centers and high performance computing applications. In order to operate efficiently, losses in the transfer of optical signals to and from the optical links and devices used in integrated optical systems need to be minimized. Efficient coupling of optical signals is needed between the light sources, chips, waveguides, fiber, and receivers used in systems as well as in the links for delivering optical signals.

Of particular interest is efficient coupling of optical signals to components used in silicon photonics technology. A typical optical data link in silicon photonics includes a light source formed in or on a silicon substrate that generates an optical signal embodying data, an optical fiber for transmitting the optical signal, and a detector for receiving the optical signal, where the detector is formed in or on a silicon substrate. The light source and detector are "on-chip" devices and efficient coupling of optical signals between the chips and the interconnected optical transmission fiber is needed to enable the technology platform. The chip containing the light source may be referred to herein as a transmitting chip and may also include devices for receiving electrical signals and converting electrical signals to optical signals. The chip containing the detector may be referred to herein as a receiving chip and may also include devices for converting optical signals to electrical signals.

Efficient coupling of optical fibers to on-chip devices is challenging because many promising applications of silicon photonics technology require implementation in confined spaces. To minimize system size, it is often necessary to deploy the optical fiber in a highly bent configuration. The optical fiber must accordingly be resistant to macrobending losses over a wide range of bending angles. In addition, the optical fiber must exhibit low microbending losses.

A variety of techniques to reduce coupling losses of optical fibers to transmitting and receiving chips have been proposed. Most techniques use lenses and light-steering elements to form an optical bridge between the transmission fiber and the transmitting and receiving chips used for optical data transmission. To date, however, progress has been limited and achieving coupling loss less than 2 dB has proven to be formidable challenge. There is a need for new techniques for improving coupling efficiency between components in integrated optical systems.

SUMMARY

A multi-purpose optical fiber with coating is provided. The optical fiber can function as a transmission fiber or as a coupling fiber for optical data links that features low coupling loss to silicon photonics lasers, VCSELs, single mode transmission fibers, multimode transmission fibers, and high speed receivers. The coupling fiber improves the efficiency of coupling between transmission fibers and chips, light sources, and detectors used in systems for optical data processing and transmission. The coupling fiber also provides high modal bandwidth and low bending loss, making it suitable for use as a multimode transmission fiber. Of particular interest is use of the coupling fiber to achieve low loss coupling of transmission fibers to chip-based light sources and detectors.

The coupling fiber is a multimode fiber with a refractive index profile designed to maximize coupling efficiency to light sources, transmission fiber, and detectors. The coupling fiber includes a core, an optional inner cladding region, an optional depressed index cladding region, an outer cladding region, and a coating. The relative refractive index profile of the coupling fiber includes a small-radius core region with an α profile and a high numerical aperture that facilitates low bending loss and high modal bandwidth. The mode field diameter of the coupling fiber is well-matched to standard single mode transmission fibers and the etendue of the coupling fiber is high enough to couple efficiently to multimode transmission fibers. The coating thickness and overall diameter of the fiber is small.

The present specification extends to:
A multimode optical fiber comprising:
a core region, said core region having an outer radius $r_1$ in the range from 10 µm to 20 µm, and a relative refractive index profile defined by the relationship:

$$\Delta_1(r) = \Delta_{1max}\left[1 - \left[\frac{r}{r_1}\right]^\alpha\right]$$

and
a cladding having an outer radius $r_4$ in the range from 35 µm to 60 µm and a relative refractive index $\Delta_4$ in the range from −0.1% to 0.1%; and
a coating surrounding said cladding, said coating having an outer radius $r_5$ less than 100 µm and a thickness less than 55 µm;
wherein said core region and said cladding form a waveguide that supports a fundamental mode and at least one higher order mode at 1310 nm and said optical fiber has an effective modal bandwidth at 1310 nm of at least 1.5 GHz-km and a numerical aperture greater than 0.22.

The present specification extends to:

A multimode optical fiber comprising:

a core region, said core region having an outer radius $r_1$ in the range from 10 µm to 20 µm, and a relative refractive index profile defined by the relationship:

$$\Delta_1(r) = \Delta_{1max}\left[1 - \left[\frac{r}{r_1}\right]^\alpha\right]$$

and a cladding, said cladding having an outer radius $r_4$ in the range from 35 µm to 60 µm and a relative refractive index $\Delta_4$ in the range from −0.1% to 0.1%; and a coating surrounding said cladding, said coating having an outer radius $r_5$ less than 100 µm and a thickness less than 55 µm;

wherein said core region and said cladding form a waveguide that supports a fundamental mode and at least one higher order mode at 850 nm and said optical fiber has an effective modal bandwidth at 850 nm of at least 1.5 GHz-km and a numerical aperture greater than 0.22.

The present specification extends to:

A multimode optical fiber comprising:

a core region, said core region having an outer radius $r_1$ in the range from 10 µm to 20 µm, and a relative refractive index profile defined by the relationship:

$$\Delta_1(r) = \Delta_{1max}\left[1 - \left[\frac{r}{r_1}\right]^\alpha\right]$$

and a cladding, said cladding having an outer radius $r_4$ in the range from 35 µm to 60 µm and a relative refractive index $\Delta_4$ in the range from −0.1% to 0.1%; and a coating surrounding said cladding, said coating having an outer radius $r_5$ less than 100 µm and a thickness less than 55 µm;

wherein said core region and said cladding form a waveguide that supports a fundamental mode and at least one higher order mode at 1550 nm and said optical fiber has an effective modal bandwidth at 1550 nm of at least 1.5 GHz-km and a numerical aperture greater than 0.22.

The present specification extends to:

A multimode optical fiber comprising:

a core region, said core region having an outer radius $r_1$ in the range from 18 µm to 22 µm, and a relative refractive index profile defined by the relationship:

$$\Delta_1(r) = \Delta_{1max}\left[1 - \left[\frac{r}{r_1}\right]^\alpha\right]$$

and a cladding, said cladding having an outer radius $r_4$ in the range from 35 µm to 60 µm and a relative refractive index $\Delta_4$ in the range from −0.1% to 0.1%; and a coating surrounding said cladding, said coating having an outer radius $r_5$ less than 100 µm and a thickness less than 55 µm;

wherein said core region and said cladding form a waveguide that supports a fundamental mode and at least one higher order mode at 1310 nm and said optical fiber has an effective modal bandwidth at 1310 nm of at least 1.5 GHz-km and a numerical aperture in the range from 0.18 to 0.24.

The present specification extends to:

A multimode optical fiber comprising:

a core region, said core region having an outer radius $r_1$ in the range from 18 µm to 22 µm, and a relative refractive index profile defined by the relationship:

$$\Delta_1(r) = \Delta_{1max}\left[1 - \left[\frac{r}{r_1}\right]^\alpha\right]$$

and a cladding, said cladding having an outer radius $r_4$ in the range from 35 µm to 60 µm and a relative refractive index $\Delta_4$ in the range from −0.1% to 0.1%; and a coating surrounding said cladding, said coating having an outer radius $r_5$ less than 100 µm and a thickness less than 55 µm;

wherein said core region and said cladding form a waveguide that supports a fundamental mode and at least one higher order mode at 1064 nm and said optical fiber has an effective modal bandwidth at 1064 nm of at least 1.5 GHz-km and a numerical aperture in the range from 0.18 to 0.24.

The present specification extends to:

A multimode optical fiber comprising:

a core region, said core region having an outer radius $r_1$ in the range from 18 µm to 22 µm, and a relative refractive index profile defined by the relationship:

$$\Delta_1(r) = \Delta_{1max}\left[1 - \left[\frac{r}{r_1}\right]^\alpha\right]$$

and a cladding, said cladding having an outer radius $r_4$ in the range from 35 µm to 60 µm and a relative refractive index $\Delta_4$ in the range from −0.1% to 0.1%; and a coating surrounding said cladding, said coating having an outer radius $r_5$ less than 100 µm and a thickness less than 55 µm;

wherein said core region and said cladding form a waveguide that supports a fundamental mode and at least one higher order mode at 850 nm and said optical fiber has an effective modal bandwidth at 850 nm of at least 1.5 GHz-km and a numerical aperture in the range from 0.18 to 0.24.

The present specification extends to:

An optical data link comprising:

a transmitter, said transmitter including a light source, said light source providing light; and a first multimode optical fiber operably connected to said transmitter, said first multimode optical fiber receiving said light from said light source, said first multimode optical fiber comprising:

a core region, said core region having an outer radius $r_1$ in the range from 10 µm to 20 µm, and a relative refractive index profile defined by the relationship:

$$\Delta_1(r) = \Delta_{1max}\left[1 - \left[\frac{r}{r_1}\right]^\alpha\right]$$

and a cladding having an outer radius $r_4$ in the range from 35 µm to 60 µm and a relative refractive index $\Delta_4$ in the range from −0.1% to 0.1%; and a coating surrounding said cladding, said coating having an outer radius $r_5$ less than 100 µm and a thickness less than 55 µm;

wherein said core region and said cladding form a waveguide that supports a fundamental mode and at least one higher order mode at 1310 nm and said optical fiber has an effective modal bandwidth at 1310 nm of at least 1.5 GHz-km and a numerical aperture greater than 0.22.

The present specification extends to:
An optical data link comprising:

a transmitter, said transmitter including a light source, said light source providing light; and a first multimode optical fiber operably connected to said transmitter, said first multimode optical fiber receiving said light from said light source, said first multimode optical fiber comprising:

a core region, said core region having an outer radius $r_1$ in the range from 10 µm to 20 µm, and a relative refractive index profile defined by the relationship:

$$\Delta_1(r) = \Delta_{1max}\left[1 - \left[\frac{r}{r_1}\right]^\alpha\right]$$

and a cladding, said cladding having an outer radius $r_4$ in the range from 35 µm to 60 µm and a relative refractive index $\Delta_4$ in the range from −0.1% to 0.1%; and a coating surrounding said cladding, said coating having an outer radius $r_5$ less than 100 µm and a thickness less than 55 µm;

wherein said core region and said cladding form a waveguide that supports a fundamental mode and at least one higher order mode at 1550 nm and said optical fiber has an effective modal bandwidth at 1550 nm of at least 1.5 GHz-km and a numerical aperture greater than 0.22.

The present specification extends to:
An optical data link comprising:

a transmitter, said transmitter including a light source, said light source providing light; and a first multimode optical fiber operably connected to said transmitter, said first multimode optical fiber receiving said light from said light source, said first multimode optical fiber comprising:

a core region, said core region having an outer radius $r_1$ in the range from 10 µm to 20 µm, and a relative refractive index profile defined by the relationship:

$$\Delta_1(r) = \Delta_{1max}\left[1 - \left[\frac{r}{r_1}\right]^\alpha\right]$$

and a cladding, said cladding having an outer radius $r_4$ in the range from 35 µm to 60 µm and a relative refractive index $\Delta_4$ in the range from −0.1% to 0.1%; and a coating surrounding said cladding, said coating having an outer radius $r_5$ less than 100 µm and a thickness less than 55 µm;

wherein said core region and said cladding form a waveguide that supports a fundamental mode and at least one higher order mode at 850 nm and said optical fiber has an effective modal bandwidth at 1550 nm of at least 1.5 GHz-km and a numerical aperture greater than 0.22.

The present specification extends to:
An optical data link comprising:

a transmitter, said transmitter including a light source, said light source providing light; and a first multimode optical fiber operably connected to said transmitter, said first multimode optical fiber receiving said light from said light source, said first multimode optical fiber comprising:

a core region, said core region having an outer radius $r_1$ in the range from 18 µm to 22 µm, and a relative refractive index profile defined by the relationship:

$$\Delta_1(r) = \Delta_{1max}\left[1 - \left[\frac{r}{r_1}\right]^\alpha\right]$$

and a cladding, said cladding having an outer radius $r_4$ in the range from 35 µm to 60 µm and a relative refractive index $\Delta_4$ in the range from −0.1% to 0.1%; and a coating surrounding said cladding, said coating having an outer radius $r_5$ less than 100 µm and a thickness less than 55 µm;

wherein said core region and said cladding form a waveguide that supports a fundamental mode and at least one higher order mode at 1310 nm and said optical fiber has an effective modal bandwidth at 1310 nm of at least 1.5 GHz-km and a numerical aperture in the range from 0.18 to 0.24.

The present specification extends to:
An optical data link comprising:

a transmitter, said transmitter including a light source, said light source providing light; and a first multimode optical fiber operably connected to said transmitter, said first multimode optical fiber receiving said light from said light source, said first multimode optical fiber comprising:

a core region, said core region having an outer radius $r_1$ in the range from 18 µm to 22 µm, and a relative refractive index profile defined by the relationship:

$$\Delta_1(r) = \Delta_{1max}\left[1 - \left[\frac{r}{r_1}\right]^\alpha\right]$$

and a cladding, said cladding having an outer radius $r_4$ in the range from 35 µm to 60 µm and a relative refractive index $\Delta_4$ in the range from −0.1% to 0.1%; and a coating surrounding said cladding, said coating having an outer radius $r_5$ less than 100 µm and a thickness less than 55 µm;

wherein said core region and said cladding form a waveguide that supports a fundamental mode and at least one higher order mode at 1064 nm and said optical fiber has an effective modal bandwidth at 1064 nm of at least 1.5 GHz-km and a numerical aperture in the range from 0.18 to 0.24.

The present specification extends to:
An optical data link comprising:

a transmitter, said transmitter including a light source, said light source providing light; and a first multimode optical fiber operably connected to said transmitter, said first multimode optical fiber receiving said light from said light source, said first multimode optical fiber comprising:
a core region, said core region having an outer radius $r_1$ in the range from 18 μm to 22 μm, and a relative refractive index profile defined by the relationship:

$$\Delta_1(r) = \Delta_{1max}\left[1 - \left[\frac{r}{r_1}\right]^\alpha\right]$$

and
a cladding, said cladding having an outer radius $r_4$ in the range from 35 μm to 60 μm and a relative refractive index $\Delta_4$ in the range from −0.1% to 0.1%; and
a coating surrounding said cladding, said coating having an outer radius $r_5$ less than 100 μm and a thickness less than 55 μm;
wherein said core region and said cladding form a waveguide that supports a fundamental mode and at least one higher order mode at 850 nm and said optical fiber has an effective modal bandwidth at 850 nm of at least 1.5 GHz-km and a numerical aperture in the range from 0.18 to 0.24.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present description, and together with the specification serve to explain principles and operation of methods, products, and compositions embraced by the present description. Features shown in the drawing are illustrative of selected embodiments of the present description and are not necessarily depicted in proper scale.

BRIEF DESCRIPTION OF THE DRAWINGS

While the specification concludes with claims particularly pointing out and distinctly claiming the subject matter of the written description, it is believed that the specification will be better understood from the following written description when taken in conjunction with the accompanying drawings, wherein:

The embodiments set forth in the drawings are illustrative in nature and not intended to be limiting of the scope of the detailed description or claims. Whenever possible, the same reference numeral will be used throughout the drawings to refer to the same or like feature.

DETAILED DESCRIPTION

Figure 1:
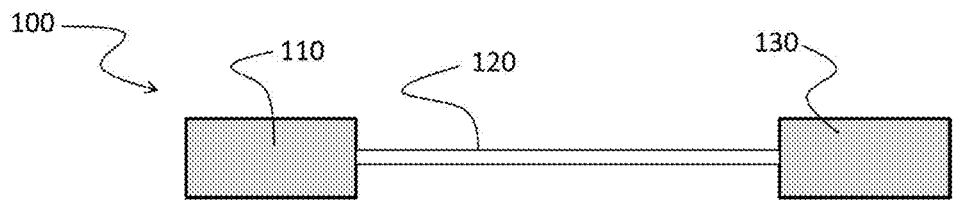
FIG. 1 depicts an optical data link that includes a transmitter, an optical transmission fiber, and a receiver.

Reference will now be made in detail to illustrative embodiments of the present description.

The present disclosure is provided as an enabling teaching and can be understood more readily by reference to the following description, drawings, examples, and claims. To this end, those skilled in the relevant art will recognize and appreciate that many changes can be made to the various aspects of the embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purpose of describing particular aspects only and is not intended to be limiting.

An explanation of selected terms as used herein is now provided:

"Include," "includes," or like terms means encompassing but not limited to, that is, inclusive and not exclusive.

The indefinite article "a" or "an" and its corresponding definite article "the" as used herein means at least one, or one or more, unless specified otherwise.

Selected measurements reported herein may be expressed in units of microns or square microns. The unit "microns"

may also be expressed as "μm" or "micron". Similarly, the unit "micron squared" may also be expressed as "μm²", "micron²" or "microns²".

As used herein, contact refers to direct contact or indirect contact. Direct contact refers to contact in the absence of an intervening material and indirect contact refers to contact through one or more intervening materials. Elements in direct contact touch each other. Elements in indirect contact do not touch each other, but do touch an intervening material or series of intervening materials, where the intervening material or at least one of the series of intervening materials touches the other. Elements in contact may be rigidly or non-rigidly joined. Contacting refers to placing two elements in direct or indirect contact. Elements in direct (indirect) contact may be said to directly (indirectly) contact each other.

As used herein, "directly adjacent" means in direct contact with, where direct contact refers to a touching relationship. In alternative embodiments, intervening layers or regions may be present between the core and cladding, or between the cladding and coating, or between the inner cladding region and core, or between the outer cladding region and the inner cladding regions, or between the primary coating and the outer cladding region. Elements within a fiber that are separated by one or more intervening regions or layers are referred to herein as being "indirectly adjacent" and are in indirect contact with each other. The term "adjacent" encompasses elements that are directly or indirectly adjacent to each other.

"Radial position" or the radial coordinate "r" refers to radial position relative to the centerline (r=0) of the fiber.

The "refractive index profile" is the relationship between refractive index or relative refractive index and fiber radius. For relative refractive index profiles depicted herein as having step boundaries between adjacent core and/or cladding regions, normal variations in processing conditions may preclude obtaining sharp step boundaries at the interface of adjacent regions. It is to be understood that although boundaries of refractive index profiles may be depicted herein as step changes in refractive index, the boundaries in practice may be rounded or otherwise deviate from perfect step function characteristics. It is further understood that the value of the relative refractive index may vary with radial position within the core region and/or any of the cladding regions. When relative refractive index varies with radial position in a particular region of the fiber (core region and/or any of the cladding regions), it may be expressed in terms of its actual or approximate functional dependence, or its value at a particular position within the region, or in terms of an average value applicable to the region as a whole. Unless otherwise specified, if the relative refractive index of a region (core region and/or any of the cladding regions) is expressed as a single value, it is understood that the relative refractive index in the region is constant, or approximately constant, and corresponds to the single value or that the single value represents an average value of a non-constant relative refractive index dependence with radial position in the region. Whether by design or a consequence of normal manufacturing variability, the dependence of relative refractive index on radial position may be sloped, curved, or otherwise non-constant.

"Relative refractive index," as used herein, is defined in Eq. 1 as:

$$\Delta_i(r_i)\% = 100\frac{(n_i^2 - n_{ref}^2)}{2n_i^2} \quad \text{Eq. 1}$$

where $n_i$ is the refractive index at radius $r_i$, unless otherwise specified, and $n_{ref}$ is the refractive index of pure silica glass, unless otherwise specified. Accordingly, as used herein, the relative refractive index percent is relative to pure silica glass. As used herein, the relative refractive index is represented by Δ (or "delta") or Δ % (or "delta %) and its values are given in units of "%", unless otherwise specified. Relative refractive index may also be expressed as Δ(r) or Δ(r) %.

The average relative refractive index ($\Delta_{ave}$) of a region of the fiber is determined from Eq. 2:

$$\Delta_{ave} = \int_{r_{inner}}^{r_{outer}} \frac{\Delta(r)dr}{(r_{outer} - r_{inner})} \quad \text{Eq. 2}$$

where $r_{inner}$ is the inner radius of the region, $r_{outer}$ is the outer radius of the region, and Δ(r) is the relative refractive index of the region.

The term "α-profile" refers to a relative refractive index profile Δ(r) that has the functional form defined in Eq. 3:

$$\Delta(r) = \Delta(r_0)\left[1 - \left[\frac{|r - r_0|}{(r_z - r_0)}\right]^\alpha\right] \quad \text{Eq. 3}$$

where $r_o$ is the radial position at which Δ(r) is maximum, $\Delta(r_0)>0$, $r_z>r_0$ is the radial position at which Δ(r) is zero, and r is in the range $r_i \le r \le r_f$, where $r_i$ is the initial radial position of the α-profile, $r_f$ is the final radial position of the α-profile, and a is a real number. $\Delta(r_0)$ for an α-profile may be referred to herein as $\Delta_{max}$ or, when referring to a specific region i of the fiber, as $\Delta_{i,max}$. When the relative refractive index profile of the fiber core region is described by an α-profile with $r_0$ occurring at the centerline (r=0) and $r_z$ corresponding to the outer radius $r_1$ of the core region, Eq. 3 simplifies to Eq. 3':

$$\Delta_1(r) = \Delta_{1max}\left[1 - \left[\frac{r}{r_1}\right]^\alpha\right] \quad \text{Eq. 3'}$$

The "etendue" of an optical fiber is defined in Eq. 4 as:

$$\text{Etendue} = (\pi r_1^2)(NA)^2 \quad \text{Eq. 4}$$

where $r_1$ is the core radius of the fiber and NA is the numerical aperture of the fiber.

The term "mode" refers to guided mode. A single-mode fiber is an optical fiber designed to support only the fundamental LP01 modes over a substantial length of the optical fiber (e.g., at least several meters), but that under certain circumstances can support multiple modes over short distances (e.g., tens of centimeters). We assume that the birefringence of the fiber is sufficiently low to assume that the two orthogonally polarized components of the LP01 mode are degenerate and propagate with the same phase velocity. A multimode optical fiber is an optical fiber designed to support the fundamental LP01 mode and at least one higher-order $LP_{nm}$ mode over a substantial length of the optical fiber, where either n≠0 or m≠1.

The operating wavelength λ of the coupling fiber is the wavelength at which the coupling fiber is operated. The operating wavelength corresponds to the wavelength of a guided mode. Representative operating wavelengths include 850 nm, 1064 nm, 1310 nm and 1550 nm, which are commonly used in telecommunications systems and optical data links that include coupling fibers of the type disclosed herein. Although a particular operating wavelength may be specified for a coupling fiber, it is understood that a particular coupling fiber can operate at multiple operating wavelengths and/or over a continuous range of operating wavelengths. Characteristics such as modal bandwidth and mode field diameter may vary with the operating wavelength and the relative refractive index profile of a particular coupling fiber may be designed to provide optimal performance at a particular operating wavelength, a particular combination of operating wavelengths, or particular continuous range of operating wavelengths.

The "mode field diameter" or "MFD" of an optical fiber is defined in Eq. 5 as:

$$MFD = 2w \qquad \text{Eq. 5}$$

$$w^2 = 2 \frac{\int_0^\infty (f(r))^2 r \, dr}{\int_0^\infty \left(\frac{df(r)}{dr}\right)^2 r \, dr}$$

where f(r) is the transverse component of the electric field distribution of the guided optical signal and r is radial position in the fiber. "Mode field diameter" or "MFD" depends on the wavelength of the optical signal and is reported herein for wavelengths of 1310 nm and 1550 nm. Specific indication of the wavelength will be made when referring to mode field diameter herein. Unless otherwise specified, mode field diameter refers to the $LP_{01}$ mode at the specified wavelength.

The splice loss between two optical fibers can be estimated based on the overlap integral of optical field amplitudes of the LP01 modes in the interconnected fibers using the following equation, $$\text{Loss(dB)} = -10 \log_{10}[\iint \varphi_1(r,\vartheta)\varphi_2(r,\vartheta) dr d\vartheta]^2,$$

where $\varphi_1$ is the optical field amplitude of the first fiber and $\varphi_2$ is the optical field amplitude of the second fiber. For the evaluation of coupling loss to single-mode fiber, we assume that the single-mode fiber has a rounded step index core with an alpha of 12, a radius of 4.7 μm and a maximum relative refractive index of 0.35%. The optical field amplitudes for refractive index profiles of this single mode fiber and the optical fibers such as those described herein can be calculated using one of several commercially available software packages such as Optiwave, BeamPROP or VPIphotonics.

The present coupling fibers include a core region, a cladding region surrounding the core region, and a coating surrounding the cladding region. The cladding region may be a single homogeneous region or may include multiple regions that differ in relative refractive index. The multiple cladding regions may be concentric regions. The cladding region may include an inner cladding region and an outer cladding region. The relative refractive index of the inner cladding region may be less than the relative refractive index of the outer cladding region. The cladding may further include a depressed index cladding region. The depressed index cladding region is a cladding region having a lower relative refractive index than adjacent inner and/or outer cladding region(s). The depressed index cladding region may also be referred to herein as a trench or trench region. The depressed index cladding region may surround an inner cladding region and/or may be surrounded by an outer cladding region. The depressed index cladding region may contribute to a reduction in bending losses.

Whenever used herein, radius $r_1$ and relative refractive index $\Delta_1(r)$ refer to the core region, radius $r_2$ and relative refractive index $\Delta_2(r)$ refer to the inner cladding region, radius $r_3$ and relative refractive index $\Delta_3(r)$ refer to the depressed index cladding region, radius $r_4$ and relative refractive index $\Delta_4(r)$ refer to the outer cladding region, and radius $r_5$ refers to the coating. Radius $r_4$ and relative refractive index $\Delta_4(r)$ will also be used to refer to the cladding region in embodiments that include a single cladding region instead of multiple cladding regions. It is understood that the central core region is substantially cylindrical in shape and that the surrounding inner cladding, depressed index cladding, outer cladding regions, and coating are substantially annular in shape. Annular regions may be characterized in terms of an inner radius and an outer radius. Radial positions $r_1$, $r_2$, $r_3$, $r_4$, and $r_5$ refer herein to the outermost radii of the core region, inner cladding region, depressed index cladding region, outer cladding region, and coating, respectively. In embodiments having a single cladding region instead of multiple cladding region, $r_4$ refers to the outermost radius of the cladding region. The radius $r_5$ also corresponds to the outer radius of the coupling fiber.

When two regions are directly adjacent to each other, the outer radius of the inner of the two regions coincides with the inner radius of the outer of the two regions. In one embodiment, for example, the fiber includes a depressed index cladding region surrounded by and directly adjacent to an outer cladding region. In such an embodiment, the radius $r_3$ corresponds to the outer radius of the depressed index cladding region and the inner radius of the outer cladding region. In embodiments in which the relative refractive index profile includes a depressed index cladding region adjacent to an inner cladding region, the radial position $r_2$ corresponds to the outer radius of the inner cladding region and the inner radius of the depressed index cladding region. In embodiments in which the relative refractive index profile includes a depressed index cladding region directly adjacent to the core, the radial position $r_1$ corresponds to the outer radius of the core and the inner radius of the depressed index cladding region. In embodiments having a single cladding region directly adjacent to the core, the radial position $r_1$ corresponds to the outer radius of the core and the inner radius of the cladding region.

The following terminology applies to embodiments in which the relative refractive index profile includes an inner cladding region. The difference between radial position $r_2$ and radial position $r_1$ may be referred to herein as the thickness of the inner cladding region. The difference between radial position $r_3$ and radial position $r_2$ may be referred to herein as the thickness of the depressed index cladding region. The difference between radial position $r_4$ and radial position $r_3$ may be referred to herein as the thickness of the outer cladding region. The difference between radial position $r_5$ and radial position $r_4$ may be referred to herein as the thickness of the coating.

The following terminology applies to embodiments in which the relative refractive index profile lacks an inner cladding region. The difference between radial position $r_3$ and radial position $r_1$ may be referred to herein as the thickness of the depressed index cladding region. The difference between radial position $r_4$ and radial position $r_3$ may be referred to herein as the thickness of the outer cladding region. The difference between radial position $r_5$ and radial position $r_4$ may be referred to herein as the thickness of the coating.

The following terminology applies to embodiments in which the relative refractive index profile lacks both an inner cladding region and a depressed index cladding region. The difference between radial position $r_4$ and radial position $r_1$ may be referred to herein as the thickness of the cladding region. The difference between radial position $r_5$ and radial position $r_4$ may be referred to herein as the thickness of the coating.

As will be described further hereinbelow, the relative refractive indices of the core region, inner cladding region, depressed index cladding region, and outer cladding region may differ. Each of the regions may be formed from silica glass or a silica-based glass. Variations in refractive index may be accomplished by incorporating updopants or downdopants at levels designed to provide a targeted refractive index or refractive index profile using techniques known to those of skill in the art. Updopants are dopants that increase the refractive index of the glass relative to the undoped glass composition. Downdopants are dopants that decrease the refractive index of the glass relative to the undoped glass composition. In one embodiment, the undoped glass is pure silica glass. When the undoped glass is pure silica glass, updopants include Cl, Br, Ge, Al, P, Ti, Zr, Nb, and Ta, and downdopants include F and B. Regions of constant refractive index may be formed by not doping or by doping at a uniform concentration. Regions of variable refractive index may be formed through non-uniform spatial distributions of dopants Coatings are formed from curable coating compositions. Curable coating compositions include one or more curable components. As used herein, the term "curable" is intended to mean that the component, when exposed to a suitable source of curing energy, includes one or more curable functional groups capable of forming covalent bonds that participate in linking the component to itself or to other components to form a polymeric coating material (i.e., the cured product). The curing process may be induced by energy. Forms of energy include radiation or thermal energy. A radiation-curable component is a component that can be induced to undergo a curing reaction when exposed to radiation of a suitable wavelength at a suitable intensity for a sufficient period of time. The radiation curing reaction may occur in the presence of a photoinitiator. A radiation-curable component may also optionally be thermally curable. Similarly, a thermally-curable component is a component that can be induced to undergo a curing reaction when exposed to thermal energy of sufficient intensity for a sufficient period of time. A thermally curable component may also optionally be radiation curable.

A curable component may include one or more curable functional groups. A curable component with only one curable functional group may be referred to herein as a monofunctional curable component. A curable component having two or more curable functional groups may be referred to herein as a multifunctional curable component or a polyfunctional curable component. Multifunctional curable components include two or more functional groups capable of forming covalent bonds during the curing process and can introduce crosslinks into the polymeric network formed during the curing process. Multifunctional curable components may also be referred to herein as "crosslinkers" or "curable crosslinkers". Examples of functional groups that participate in covalent bond formation during the curing process are identified hereinafter.

In the description of coating compositions that follows, various components of composition will be discussed and the amounts of particular components in the composition will be specified in terms of weight percent (wt %) or parts per hundred (pph). The components of the coating compositions include base components and additives. The concentration of base components will be expressed in terms of wt % and the concentration of additives will be expressed in terms of pph.

As used herein, the weight percent of a particular base component refers to the amount of the component present in the composition on a basis that excludes additives. The additive-free composition includes only base components and may be referred to herein as a base composition. Any crosslinker component(s), oligomer(s), diluent component(s), and polymerization initiator(s) present in a composition are regarded individually as base components and collectively as a base composition. The base composition minimally includes a radiation-curable component and a polymerization initiator. The radiation-curable component may be a radiation-curable crosslinker or a radiation-curable diluent. The base composition may, however, include one or more radiation-curable crosslinker components, one or more radiation-curable diluent components, one or more non-radiation-curable components, and one or more polymerization initiators. The collective amount of base components in a primary composition is regarded herein as equaling 100 weight percent.

Additives are optional and may include one or more of an adhesion promoter, an antioxidant, a catalyst, a carrier or surfactant, a tackifier, a stabilizer, a UV absorber, and an optical brightener. Representative additives are described in more detail hereinbelow. The amount of additives introduced into the composition is expressed herein in parts per hundred (pph) relative to the base composition. For example, if 1 g of a particular additive is added to 100 g of base composition, the concentration of additive will be expressed herein as 1 pph.

The present description provides a coupling optical fiber that improves the efficiency of coupling between transmission fibers and chips, light sources, and detectors used in systems for optical data processing and transmission. The coupling fiber is a multi-purpose optical fiber suitable for coupling to single mode and multimode light sources. The coupling fiber also provides high modal bandwidth, low macrobending loss, and low microbending loss. In addition to use in coupling, the coupling fiber is suitable for use as a transmission fiber.

The coupling fiber is a multimode fiber with a refractive index profile designed to maximize coupling efficiency to light sources, transmission fiber, and detectors. Of particular interest is use of the coupling fiber to achieve low loss coupling of transmission fibers to chip-based light sources and detectors, including applications in which the coupling fiber is deployed in a tight bending configuration.

FIG. 1 illustrates a representative optical data link that can be used for data transmission in data centers, high performance computing, and other applications. Optical data link 100 includes transmitter 110, transmission fiber 120, and receiver 130. Transmitter 110 includes a light source that generates an optical signal. The optical signal is light that embodies, encodes or otherwise represents information or data. Light sources include lasers and diodes. Representative light sources include silicon photonics lasers and VCSELs (vertical cavity surface emitting lasers). The optical signal from these light sources is modulated at a line rate of 10 Gb/s or higher, for example 25 Gb/s, 28 Gb/s, 50 Gb/s or 56 Gb/s. In one embodiment, transmitter 110 is implemented as a chip, such as a silicon chip compatible with the silicon photonics technology platform. Transmitter 110 may also include devices for receiving electrical signals and configuring the light source to produce optical signal(s) corresponding to electrical signal(s).

Transmission fiber 120 is interconnected with transmitter 110 and receives the optical signal produced by the light source. Transmission fiber 120 may receive the optical signal directly from the light source. Alternatively, the light source may be coupled to a waveguide (e.g. an on-chip waveguide) and the waveguide may be coupled to transmission fiber 120. Transmission fiber 120 delivers the optical signal to receiver 130. Transmission fiber 120 may be a single mode fiber or a multimode fiber. In one embodiment, transmission fiber 120 is a silica-based fiber that includes a higher index silica-based core and a lower index silica-based cladding.

Receiver 130 receives the optical signal from transmission fiber 120. Receiver 130 includes a detector, such as a photodetector, that provides an output characteristic of the optical signal. The detector is responsive to the wavelength(s) of the optical signal. The detector may convert the optical signal to an electrical signal having a current or voltage proportional to or otherwise characteristic of the optical signal. In one embodiment, receiver 130 is implemented as a chip, such as a silicon chip compatible with the silicon photonics technology platform. The receiver 130 may receive the signal directly from transmission fiber 120 or indirectly from transmission fiber 120 via a waveguide (e.g. an on-chip waveguide).

In the optical data link shown in FIG. 1, transmitter 110 produces light, transmission fiber 120 is operably connected to transmitter 110 and receives the light produced by transmitter 110, and receiver 130 is operably connected to transmission fiber 120 and receives the light from transmission fiber 120.

In order to be a viable commercial technology, optical data links need to efficiently generate, transmit, and detect optical signals. Loss of optical signal intensity is particularly problematic at the junction between the transmitter and transmission fiber and at the junction between the transmission fiber and the receiver. Important considerations include efficient coupling of the light source to the transmission fiber and efficient coupling of the transmission fiber to the detector.

Figure 2:
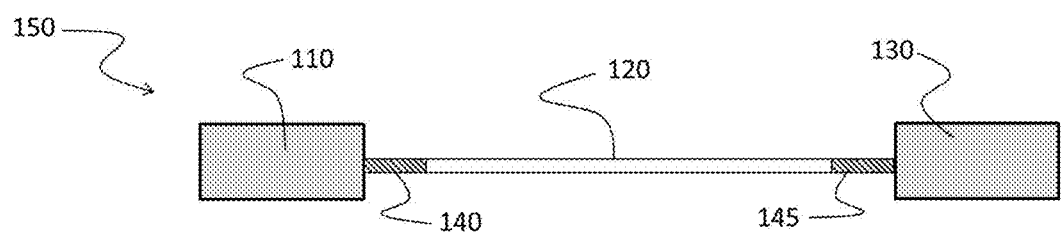
FIG. 2 depicts an optical data link that includes a transmitter, an optical transmission fiber, a receiver, and two coupling fibers.

The present disclosure provides a coupling fiber that facilitates efficient transfer of optical signals from light source to transmission fiber and from transmission fiber to detector. The coupling fiber can be inserted at the junction between light source (or transmitter) and transmission fiber and/or at the junction between the transmission fiber and detector (or receiver). FIG. 2 shows an embodiment in which coupling fibers are inserted in the optical data link at each of the junctions. Optical data link 150 includes transmitter 110, transmission fiber 120, receiver 130, coupling fiber 140 and coupling fiber 145. Coupling fiber 140 is positioned between transmitter 110 and transmission fiber 120 and promotes efficient coupling of light from a light source of transmitter 110 to transmission fiber 120. Coupling fiber 145 is positioned between transmission fiber 120 and receiver 130 and promotes efficient coupling of light from transmission fiber 120 to a detector of receiver 130.

In the optical data link shown in FIG. 2, transmitter 110 includes a light source and produces light, coupling fiber 140 is operably connected to transmitter 110. Coupling fiber 140 receives the light produced by transmitter 110 and transmits it to transmission fiber 120. Transmission fiber 120 is operably connected to coupling fiber 140, receives the light transmitted by coupling fiber 140 and transmits it to coupling fiber 145. Coupling fiber 145 is operably connected to transmission fiber 120. Coupling fiber 145 receives the light transmitted by transmission fiber 120 and transmits it to receiver 130. Receiver 130 is operably connected to coupling fiber 145 and receives the light transmitted by coupling fiber 145.

Figure 3:
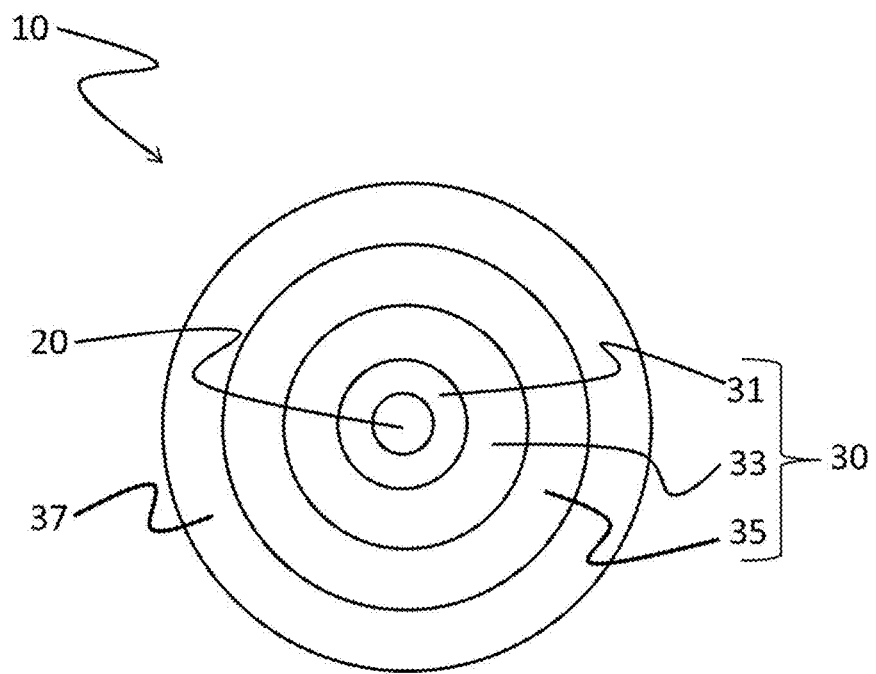
FIG. 3 depicts a cross-sectional view of a coupling fiber having a core region, an inner cladding region, a depressed index cladding region, and an outer cladding region.
Figure 4:
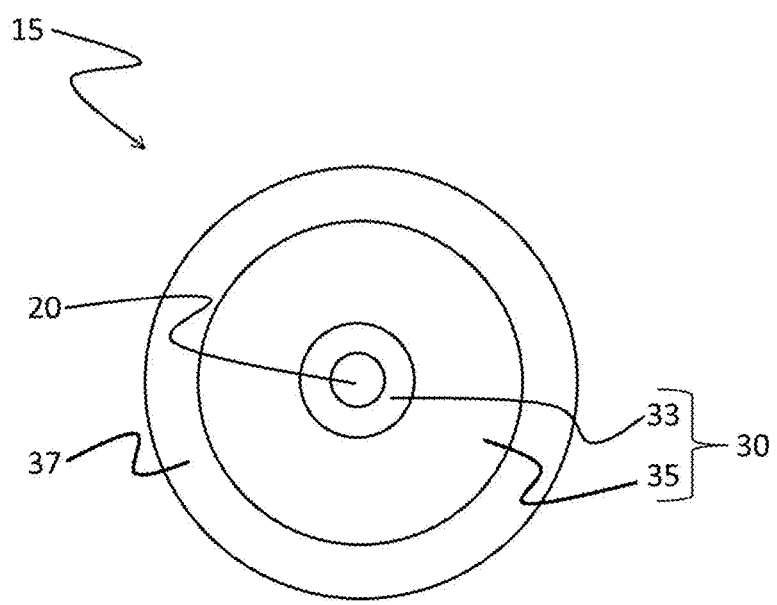
FIG. 4 depicts a cross-sectional view of a coupling fiber having a core region, a depressed index cladding region, an outer cladding region, and a coating.
Figure 5:
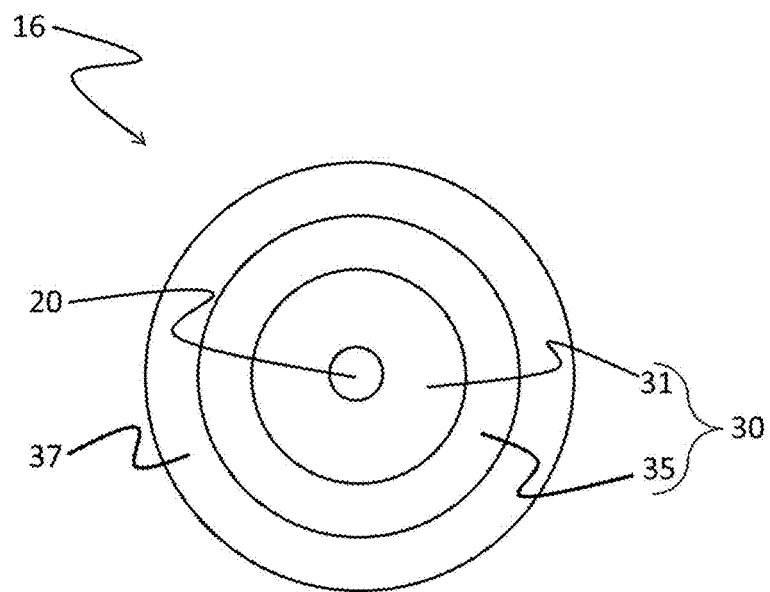
FIG. 5 depicts a cross-sectional view of a coupling fiber having a core region, an inner cladding region, an outer cladding region, and a coating.
Figure 6:
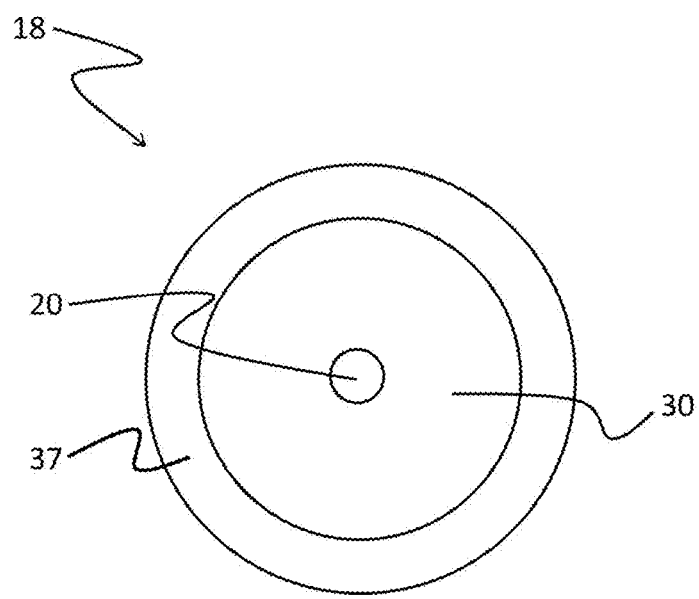
FIG. 6 depicts a cross-sectional view of a coupling fiber having a core region, a cladding region, and a coating.

A schematic cross-sectional depiction of a coupling fiber is shown in FIG. 3. Coupling fiber 10 includes core region 20, cladding region 30, and coating 37. Cladding region 30 includes inner cladding region 31, depressed index cladding region 33, and outer cladding region 35. Inner cladding region 31 is optional and may be omitted as shown for fiber 15 in FIG. 4. Depressed index cladding region 33 is optional and may be omitted as shown for fiber 16 in FIG. 5. FIG. 6 shows a fiber with cladding region 30 that omits inner cladding region 31 and depressed index cladding region 33. Coating 37 may consist of a single layer or may include two or more layers.

In one embodiment, the coupling fiber includes a core surrounded by an inner cladding region, a depressed index cladding region surrounding the inner cladding regions, an outer cladding region surrounding the depressed index cladding region, and a coating surrounding the outer cladding region. The inner cladding region may be directly adjacent to the core, the depressed index cladding region may be directly adjacent to the inner cladding region, the outer cladding region may be directly adjacent to the depressed index cladding region, and the coating may be directly adjacent to the outer cladding region. In another embodiment, the coupling fiber lacks an inner cladding region and includes a depressed index cladding region surrounding a core, an outer cladding region surrounding the depressed index cladding region, and a coating surrounding the outer cladding region. The depressed index cladding region may be directly adjacent to the core region, the outer cladding region may be directly adjacent to the depressed index cladding region, and the coating may be directly adjacent to the outer cladding region. In a further embodiment, the coupling fiber lacks an inner cladding region and a depressed index cladding region and includes a cladding region surrounding a core and a coating surrounding the cladding region. The cladding region may be directly adjacent to the core and the coating may be directly adjacent to the cladding region.

Figure 7:
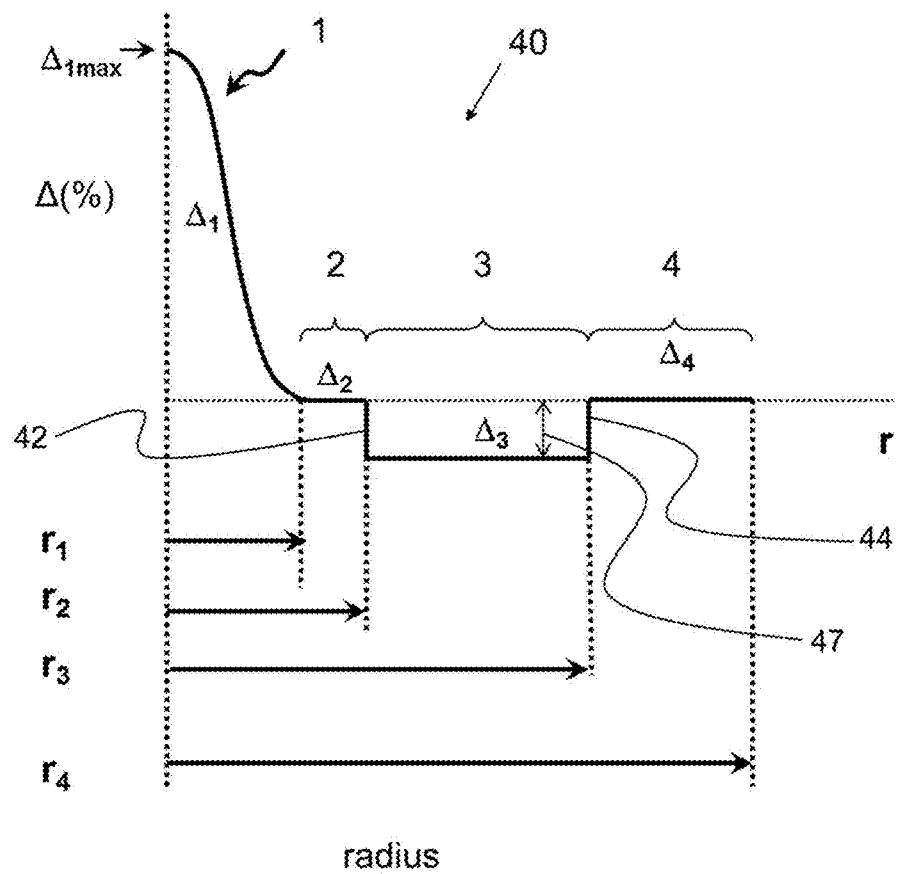
FIG. 7 depicts the relative refractive index profile of a coupling fiber having a core region, an inner cladding region, a depressed index cladding region, and an outer cladding region.
Figure 9:
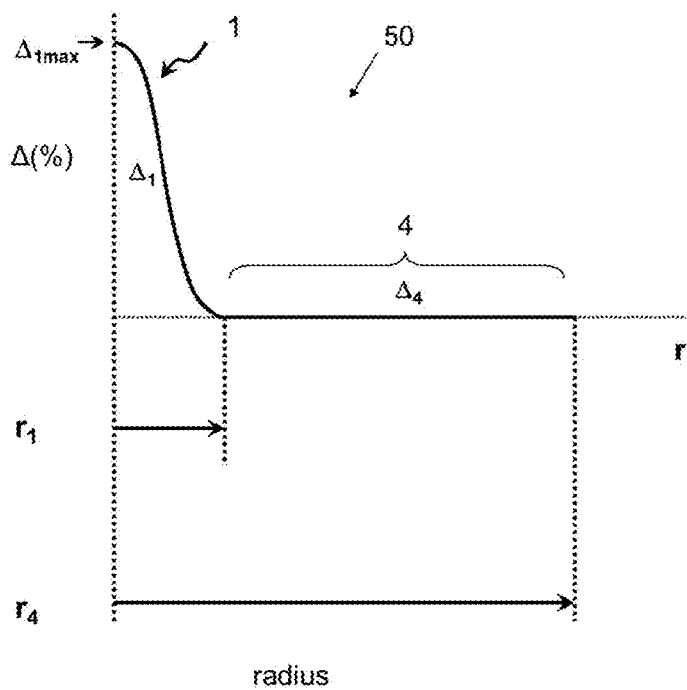
FIG. 9 depicts a relative refractive index profile of a coupling fiber having a core region and a cladding.

A representative relative refractive index profile for the glass portion (core and cladding regions) of a coupling fiber is presented in FIG. 7. FIG. 7 shows a rectangular trench profile for a coupling fiber 40 having a core region (1) with outer radius $r_1$ and relative refractive index $\Delta_1$, an inner cladding region (2) extending from radial position $r_1$ to radial position $r_2$ and having relative refractive index $\Delta_2$, a depressed index cladding region (3) extending from radial position $r_2$ to radial position $r_3$ and having relative refractive index $\Delta_3$, and an outer cladding region (4) extending from radial position $r_3$ to radial position $r_4$ and having relative refractive index $\Delta_4$. In the profile of FIG. 7, the depressed index cladding region (3) may be referred to herein as a trench and may have a constant refractive index that is less than the refractive indices of the inner cladding region (2) and the outer cladding region (4). Core region (1) has the highest relative refractive index in the profile. Core region (1) may include a lower index region at or near the centerline (known in the art as a "centerline dip") (not shown). It should be noted that the inner cladding region (2) is optional and may be eliminated as noted hereinabove. When inner cladding region (2) is missing, depressed index cladding region (3) is directly adjacent core region (1) as shown for coupling fiber 45 in FIG. 8. When inner cladding region (2)

and depressed index cladding 3 are missing, cladding region (4) is directly adjacent core region (1) as shown for coupling fiber 50 in FIG. 9.

Figure 8:
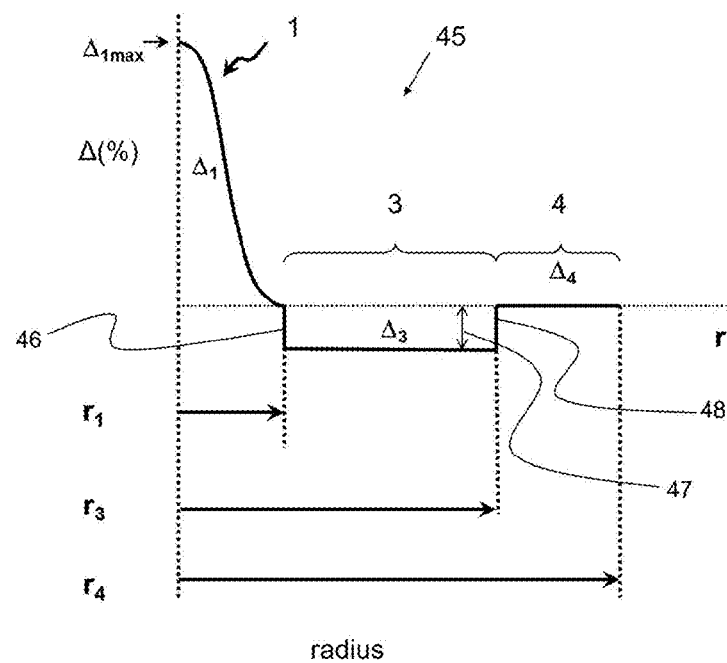
FIG. 8 depicts a relative refractive index profile of a coupling fiber having a core region, a depressed index cladding region, and an outer cladding region.

In the embodiments shown in FIGS. 7-9, the core region of the coupling fiber has a relative refractive index described by an α-profile. The radial position $r_0$ (corresponding to $\Delta_{1max}$) of the α-profile may correspond to the centerline (r=0) of the fiber or a radial position near the centerline of the fiber and the radial position $r_z$ of the α-profile may correspond to the core radius $r_1$.

In FIG. 7, transition region 42 from inner cladding region (2) to depressed index cladding region (3) and transition region 44 from depressed index cladding region (3) to outer cladding region (4) are shown as step changes. It is to be understood that a step change is an idealization and that transition region 42 and transition region 44 may not be strictly vertical in practice as indicated in FIG. 7. Instead, transition region 42 and transition region 44 may have a slope or curvature. When transition region 42 and transition region 44 are non-vertical, the inner radius $r_2$ and outer radius $r_3$ of depressed index cladding region (3) correspond to the mid-points of transition regions 42 and 44, respectively. The mid-points correspond to half of the depth 47 of the depressed index cladding region (3). An analogous interpretation applies to fiber 45 shown in FIG. 8 when transition regions 46 and 48 are sloped or curved.

The relative ordering of relative refractive indices $\Delta_1$, $\Delta_2$, $\Delta_3$, and $\Delta_4$ in the relative refractive index profile shown in FIG. 7 satisfy the conditions $\Delta_{1max} > \Delta_4 > \Delta_3$ and $\Delta_{1max} > \Delta_2 > \Delta_3$. The values of $\Delta_2$ and $\Delta_4$ may be equal or either may be greater than the other, but both $\Delta_2$ and $\Delta_4$ are between $\Delta_{1max}$ and $\Delta_3$. The relative ordering of relative refractive indices $\Delta_1$, $\Delta_3$, and $\Delta_4$ in the relative refractive index profile shown in FIG. 8 satisfy the conditions $\Delta_{1max} > \Delta_4 > \Delta_3$.

The relative refractive index profiles of the coupling fibers have been designed to optimize coupling efficiency in optical data links. Selected characteristics relevant to efficient coupling for light sources, transmission fibers, and detectors in common use in optical data links are now described. Following discussion of these characteristics, exemplary relative refractive index profiles and parameters for coupling fibers that provide efficient optical coupling are presented.

Single mode and multimode VCSELs (vertical cavity surface emitting lasers) are attractive light sources for silicon photonics applications. Single mode VCSELs typically have a full-width-half-max (FWHM) beam divergence angle less than 12° (NA of about 0.1), a spot size with a diameter in the 6-10 µm range, and an etendue of a few square microns. Multimode VCSELs typically have a higher beam divergence angle, an NA of about 0.20), a spot size with a diameter in the 20-30 µm range, and an etendue on the order of 10 µm². The numerical aperture and spot size of single mode and multimode VCSELs match well with common single mode and multimode transmission fibers, respectively, but coupling losses depend critically on alignment, and precise alignment of VCSEL arrays with multiple single mode fibers is challenging.

Silicon photonics transceivers couple laser light from single mode lasers into very small waveguides within which the light is modulated and then directed through a 90° turn via a grating or mirror so that the light vertically exits the top surface of the chip. The small size of the silicon photonics waveguide results in wider FWHM beam divergence angles, numerical apertures as high as 0.4, spot sizes with diameters in the 4-10 µm range, and an etendue of a few square microns. Like VCSELs, the optical parameters of silicon photonics lasers are consistent with efficient coupling to common multimode transmission fibers, subject to alignment constraints. Sensitivity to angular misalignments is typically high due to the high NA of the silicon photonic waveguide.

Single mode transmission fibers typically have a core diameter of ~9 µm at 1310 nm and a numerical aperture (NA) of 0.12 at 1310 nm. Multimode transmission fibers typically have a core diameter of ~50 µm, a numerical aperture (NA) of 0.20, and an etendue of ~75 µm².

High speed optical receivers for operation at 25 Gb/s or higher typically include Ge photodiodes (p-i-n devices), which typically have apertures for receiving light in the range from 25-35 µm. When Ge photodiodes are implemented in optical data links with standard 50 µm multimode transmission fibers, overfilling of aperture of Ge photodiodes becomes a concern. Overfilling not only leads to high coupling losses, also to back reflections that have the potential to damage the light source.

The present coupling fibers have relative refractive index profiles designed for efficient coupling to the light sources, transmission fibers, and detectors typically included in optical data links. The coupling fibers are multimode fibers with high numerical aperture (NA), a core diameter intermediate between typical core diameters of single mode and multimode transmission fibers, and high modal bandwidth. The mode field diameter (MFD) of the coupling fibers is closely matched to single mode transmission fibers to minimize coupling losses to single mode fibers and at the same time, the etendue of the coupling fibers is high enough to couple efficiently to multimode transmission fibers. The ability to provide low loss coupling to both single-mode and multi-mode fibers enables the coupling fibers to be used in either the single-mode or multimode regime. The high etendue and high numerical aperture (NA) of the coupling fibers insures efficient coupling to single mode VCSELs, multimode VCSELS, single mode silicon photonics lasers and multi-mode silicon photonics lasers. The core diameter of the coupling fiber is sufficiently small to minimize overfilling of the aperture of high speed Ge photodetectors. The coupling fiber also features high modal bandwidth, which enables it to be used as a multimode transmission fiber.

The relative refractive index profiles of the coupling fibers optionally include a depressed-index cladding region. A depressed-index cladding region may assist in reducing bending losses and may also promote high modal bandwidth by reducing time delays of different mode groups. The relative refractive index profile with depressed index cladding regions may be of the form shown in FIGS. 7 and 8.

In one embodiment, the relative refractive index of the core of the coupling fiber is described by an α-profile with an α value in the range from 1.8-3.0, or in the range from 1.85 to 3.0, or in the range from 1.85-2.5, or in the range from 1.9-2.3, or in the range from 1.95-2.2, or in the range from 1.8-2.05, or in the range from 1.85-2.05, or in the range from 1.9-2.05, or in the range from 1.95-2.05. The outer radius $r_1$ of the core may be in the range from 8 µm-22 µm, or in the range from 10 µm-20 µm, or in the range from or in the range from 11 µm-19 µm, or in the range from 12 µm-18 µm, or in the range from 13 µm-17 µm, or in the range from 18 µm-22 µm.

The maximum relative refractive index $\Delta_{1max}$ in the core may be in the range from 0.9%-2.8%, or in the range from 1.2%-2.6%, or in the range from 1.5%-2.4%, or in the range from 1.6%-2.2%, or in the range from 1.7%-2.1%, or in the range from 1.8%-2.1%, or in the range from 1.85%-2.05%, or in the range from 0.8%-1.2%, or in the range from 0.9 to 1.1%.

In embodiments in which the relative refractive index profile includes a depressed index cladding region, the relative refractive index $\Delta_3$ may be in the range from −1.0% to −0.1%, or in the range from −0.8% to −0.1%, or in the range from −0.7% to −0.2%, or in the range from −0.6% to −0.2%, or in the range from −0.5% to −0.2%.

The inner radius $r_1$ (in embodiments in which the depressed index cladding region is directly adjacent to a core) or $r_2$ (in embodiments in which the depressed index cladding region is directly adjacent to an inner cladding region) of the depressed index cladding region may be in the range from 10 μm-23 μm, or in the range from 10 μm-20 μm, or in the range from 11 μm-20 μm, or in the range from 12 μm-19 μm, or in the range from or in the range from 13 μm-18 μm, or in the range from 14 μm-17 μm, or in the range from 18 μm-23 μm. The outer radius $r_3$ of the depressed index cladding region may be in the range from 14 μm-28 μm, or in the range from 14 μm-24 μm, or in the range from 15 μm-23 μm, or in the range from or in the range from 16 μm-22 μm, or in the range from 17 μm-21 μm, or in the range from 18 μm-20 μm, or in the range from 20 μm-28 μm. The thickness $r_3-r_2$ (in embodiments in which the depressed index cladding region is directly adjacent to an inner cladding region) or $r_3-r_1$ (in embodiments in which the depressed index cladding region is directly adjacent to a core) of the depressed index cladding region may be in the range from 2 μm-8 μm, or in the range from 2 μm-7 μm, or in the range from or in the range from 3 μm-7 μm, or in the range from 3 μm-6 μm, or in the range from 3 μm-5 μm.

In embodiments in which the relative refractive index profile includes an inner cladding region, the relative refractive index $\Delta_2$ may be in the range from −0.2% to 0.2%, or in the range from −0.15% to 0.15%, or in the range from −0.1% to 0.1%, or in the range from −0.05% to 0.05%. The thickness $r_2-r_1$ of the inner cladding region may be in the range from 0.5 μm-3.5 μm, or in the range from 0.7 μm-2.0 μm, or in the range from 0.7 μm-1.5 μm.

The relative refractive index $\Delta_4$ of the outer cladding region may be in the range from −0.2% to 0.2%, or in the range from −0.15% to 0.15%, or in the range from −0.1% to 0.1%, or in the range from −0.05% to 0.05%. The outer radius $r_4$ of the outer cladding region may be less than 60 μm, or less than 55 μm, or less than 50 μm, or less than 45 μm, or in the range from 35 μm-60 μm, or in the range from 35 μm-55 μm, or in the range from 35 μm-50 μm, or in the range from 35 μm-45 μm. The thickness $r_4-r_3$ of the outer cladding region may be in the range from 10 μm-50 μm, or in the range from 15 μm-40 μm, or in the range from 15 μm-30 μm, or in the range from 15 μm-25 μm.

The present multi-purpose optical fibers feature high numerical aperture (NA). The numerical aperture of the fiber may be greater than 0.18, or greater than 0.20, or greater than 0.22, or greater than 0.24, or greater than 0.26, or in the range from 0.18-0.32, or in the range from 0.20-0.32, or in the range from 0.24-0.32, or in the range from 0.18 to 0.24, or in the range from 0.18 to 0.22.

Representative Examples 1-14 of relative refractive index profiles for the coupling fiber are summarized in Tables 1A, 2A, and 3A. Examples 1-14 of the coupling fiber are multimode fibers. Examples 1-8 given in Tables 1A and 2A are designed to provide high bandwidth at an operating wavelength of 1310 nm and the illustrative Examples 9-14 given in Table 3A are designed to provide high bandwidth at an operating wavelength of 1550 nm. Table 1A also includes characteristics of a typical single mode transmission fiber and a comparative coupling fiber. The comparative coupling fiber is a multimode fiber with a numerical aperture of 0.28 and a core diameter of 50 μm.

Examples 1-14 are based on a relative refractive index profile similar to the profile shown in FIG. 8. The relative refractive index profiles of Examples 1-14 included a core region with an α-profile, a depressed index cladding region and an outer cladding region. The relative refractive index profiles of the Examples 1-14 differed from the profile shown in FIG. 8 in that the transition region between the core and depressed index cladding region and the transition region between the depressed index cladding region and the outer cladding region were sloped.

The following modeled characteristics of the relative refractive index profile are included in Tables 1A, 2A, and 3A: $\Delta_{1max}$, expressed in units of %, corresponds to the maximum value of relative refractive index for the α-profile in the core region. For Examples 1-14, $\Delta_{1max}$ occurs at the centerline (r=0) position of the coupling fiber. $r_1$, expressed in units of microns, is the outer radial position of the core region. For Examples 1-14, $r_1$ corresponds to $r_z$, the radial position of the core α-profile at which $\Delta=0$. α corresponds to the value of α for the relative refractive index profile of the core. $r_1'$, expressed in units of microns, corresponds to the inner radius of the depressed index cladding region. $r_3$, expressed in units of microns, corresponds to the outer radius of the depressed index cladding region. $\Delta_3$ is the relative refractive index of the depressed index cladding region. For Examples 1-14, the depressed index cladding region has an approximately constant relative refractive index value between the transition regions with the core region and outer cladding regions. $\Delta_4$ is the relative refractive index of the outer cladding region and $r_4$ is the outer radius of the outer cladding region and is equal to 40.0 μm in each of Examples 1-14, but can have any value in the range from 35 μm to 62.5 μm without affecting any of the disclosed optical characteristics.

Because the transition region from the core region to the depressed index cladding region is sloped, the inner radius $r_1'$ of the depressed index cladding region differs from the outer radius $r_1$ of the core region. $r_1'$ is selected as the radial position corresponding to half of the depth of the depressed index cladding region. Similarly, the outer radius $r_3$ of the depressed index cladding region is selected as the radial position corresponding to half of the depth of the depressed index cladding region. For Examples 1-14, the depth of the depressed index cladding region is $\Delta_3$ and the radial position corresponding to half depth is the radial position corresponding to $\frac{1}{2}\Delta_3$. $r_1'$ is the position of half depth adjacent the core region and $r_3$ is the position of half depth adjacent the outer cladding region.

Figure 10:
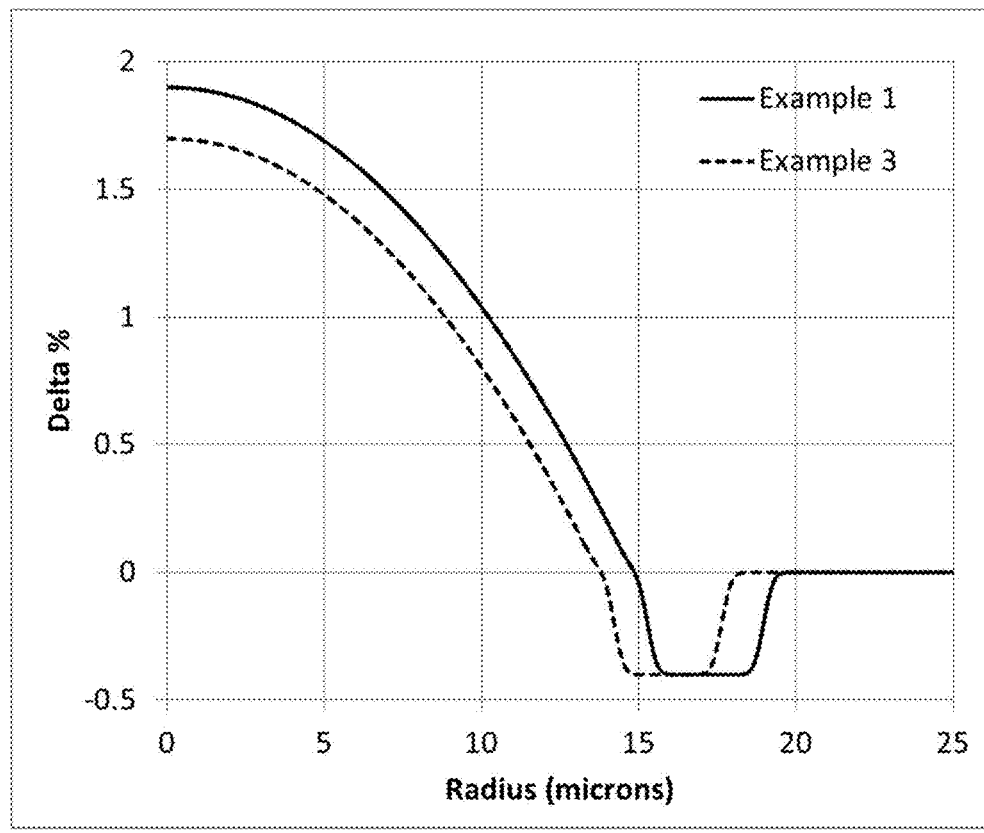
FIG. 10 depicts the relative refractive index profile of two selected coupling fibers in accordance with the present specification.

FIG. 10 depicts the relative refractive index profiles of Examples 1 and 3 described in Table 1A. The sloped transition regions from the core region to the depressed index cladding region and from the depressed index cladding region to the outer cladding region for illustrative Examples 1 and 3 are evident.

Tables 1B, 2B, and 3B summarize modeled performance characteristics for the fibers having the relative refractive index profile parameters listed in Tables 1A, 2A, and 3A, respectively. The performance characteristics include effective modal bandwidth (EMB) (expressed in units of GHz-km) at various indicated wavelengths, numerical aperture (NA), mode field diameter (MFD) (expressed in units of microns) for the LP01 mode at various indicated wavelengths, and etendue (expressed in units of $\mu m^2$).

TABLE 1A

Relative Refractive Index Characteristics of Illustrative Coupling Fibers

|  | Single Mode Fiber | Examples 1 | 2 | 3 |
|---|---|---|---|---|
| $\Delta_{1max}$ (%) | 0.35 | 1.9 | 1.8 | 1.7 |
| $r_1$ (μm) | 4.70 | 14.74 | 14.12 | 13.68 |
| α | 12 | 2.035 | 2.033 | 2.031 |
| $\Delta_3$ (%) | N/A | −0.4 | −0.4 | −0.4 |
| $r_1'$ (μm) | N/A | 15.28 | 14.65 | 14.22 |
| $r_3$ (μm) | N/A | 18.97 | 18.18 | 17.65 |
| $\Delta_4$ (%) | 0 | 0 | 0 | 0 |
| $r_4$ (μm) | 62.5 | 40.0 | 40.0 | 40.0 |

TABLE 1B

Performance Characteristics of Illustrative Coupling Fibers

|  | Single Mode Fiber | Examples 1 | 2 | 3 |
|---|---|---|---|---|
| EMB at 1270 nm (GHz-km) |  | 5.43 | 5.92 | 5.98 |
| EMB at 1290 nm (GHz-km) |  | 10.72 | 12.46 | 11.81 |
| EMB at 1310 nm (GHz-km) |  | 26.71 | 38.23 | 44.03 |
| EMB at 1330 nm (GHz-km) |  | 9.95 | 10.35 | 12.71 |
| NA | 0.12 | 0.29 | 0.28 | 0.27 |
| LP01 MFD at 1310 nm (μm) | 9.20 | 9.25 | 9.22 | 9.21 |
| LP01 MFD at 1550 nm (μm) | 10.40 | 10.12 | 10.04 | 10.03 |
| Coupling loss to Single Mode Fiber at 1310 nm (dB) | 0.0 | 0.01 | 0.01 | 0.01 |
| Etendue (μm²) | 1.0 | 56.4 | 48.9 | 43.3 |

TABLE 2A

Relative Refractive Index Characteristics of Illustrative Coupling Fibers

| Examples | 4 | 5 | 6 | 7 | 8 |
|---|---|---|---|---|---|
| $\Delta_{1max}$ (%) | 2.1 | 1.9 | 1.9 | 1.9 | 1.9 |
| $r_1$ (μm) | 16.06 | 13.76 | 16.13 | 14.38 | 14.52 |
| α | 2.036 | 2.034 | 2.034 | 2.034 | 2.033 |
| $\Delta_3$ (%) | −0.4 | −0.4 | −0.4 | −0.48 | −0.33 |
| $r_1'$ (μm) | 16.57 | 14.24 | 16.69 | 15.00 | 14.91 |
| $r_3$ (μm) | 20.58 | 17.68 | 20.72 | 18.60 | 18.54 |
| $\Delta_4$ (%) | 0 | 0 | 0 | 0 | 0 |
| $r_4$ (μm) | 40.0 | 40.0 | 40.0 | 40.0 | 40.0 |

TABLE 2B

Performance Characteristics of Illustrative Coupling Fibers

| Examples | 4 | 5 | 6 | 7 | 8 |
|---|---|---|---|---|---|
| EMB at 1270 nm (GHz-km) | 4.75 | 5.53 | 5.90 | 5.49 | 4.61 |
| EMB at 1290 nm (GHz-km) | 9.26 | 11.41 | 11.16 | 10.65 | 7.06 |
| EMB at 1310 nm (GHz-km) | 24.49 | 37.78 | 30.11 | 34.00 | 37.49 |
| EMB at 1330 nm (GHz-km) | 9.02 | 10.39 | 9.06 | 9.88 | 13.65 |
| NA | 0.30 | 0.29 | 0.29 | 0.29 | 0.29 |
| LP01 MFD at 1310 nm (μm) | 9.45 | 8.97 | 9.72 | 9.09 | 9.22 |
| LP01 MFD at 1550 nm (μm) | 10.29 | 9.77 | 10.58 | 9.99 | 10.04 |
| Coupling loss to Single Mode Fiber at 1310 nm (dB) | 0.01 | 0.02 | 0.02 | 0.01 | 0.01 |
| Etendue (μm²) | 74.3 | 49.3 | 67.8 | 53.9 | 54.9 |

TABLE 3A

Relative Refractive Index Characteristics of Illustrative Coupling Fibers

| Examples | 9 | 10 | 11 | 12 | 13 | 14 |
|---|---|---|---|---|---|---|
| $\Delta_{1max}$ (%) | 1.9 | 1.9 | 1.9 | 1.9 | 2.1 | 2.1 |
| $r_1$ (μm) | 14.76 | 14.62 | 14.62 | 15.81 | 16.22 | 14.68 |
| α | 2.005 | 2.005 | 2.004 | 2.004 | 2.006 | 2.006 |
| $\Delta_3$ (%) | −0.4 | −0.55 | −0.37 | −0.4 | −0.4 | −0.4 |
| $r_1'$ (μm) | 15.27 | 15.39 | 15.04 | 16.36 | 16.71 | 15.10 |
| $r_3$ (μm) | 18.96 | 19.04 | 18.69 | 20.31 | 20.76 | 18.77 |
| $\Delta_4$ (%) | 0 | 0 | 0 | 0 | 0 | 0 |
| $r_4$ (μm) | 40.0 | 40.0 | 40.0 | 40.0 | 40.0 | 40.0 |

TABLE 3B

Performance Characteristics of Illustrative Coupling Fibers

| Examples | 9 | 10 | 11 | 12 | 13 | 14 |
|---|---|---|---|---|---|---|
| EMB at 1530 nm (GHz-km) | 13.56 | 9.63 | 12.44 | 11.65 | 9.70 | 7.24 |
| EMB at 1550 nm (GHz-km) | 33.89 | 24.89 | 43.40 | 36.07 | 26.36 | 31.14 |
| EMB at 1570 nm (GHz-km) | 13.93 | 14.83 | 17.55 | 15.62 | 11.61 | 13.57 |
| NA | 0.29 | 0.29 | 0.29 | 0.29 | 0.30 | 0.303 |
| LP01 MFD at 1310 nm (μm) | 9.24 | 9.19 | 9.18 | 9.56 | 9.41 | 8.56 |
| LP01 MFD at 1550 nm (μm) | 10.07 | 10.02 | 10.02 | 10.42 | 10.28 | 9.78 |
| Coupling loss to Single Mode Fiber at 1550 nm (dB) | 0.04 | 0.04 | 0.04 | 0.03 | 0.03 | 0.05 |
| Etendue (μm²) | 56.61 | 55.5 | 55.5 | 64.9 | 75.9 | 62.1 |

Figure 11:
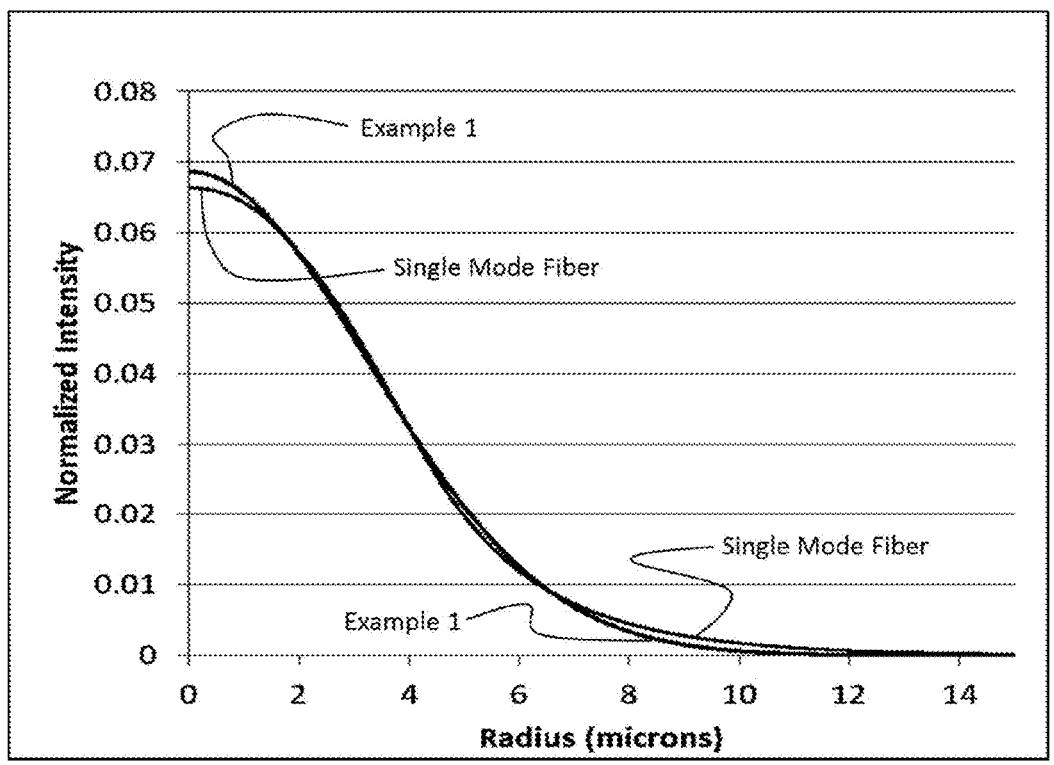
FIG. 11 compares the optical field intensity of the LP01 mode at 1310 nm for a standard single mode transmission fiber and a selected coupling fiber in accordance with the present specification.

FIG. 11 compares the optical field intensity of the LP01 mode at 1310 nm for Example 1 and the single mode transmission fiber with the relative refractive index characteristics described in Table 1A. The close match of the optical field distribution for the coupling fiber and single mode transmission fiber indicates that highly efficient coupling between the coupling fiber and the single mode transmission fiber is possible. Based on the overlap integral of optical field intensity, the coupling loss between each of these illustrative coupling fibers and standard single mode fiber is less than 0.1 dB. Another indication of low coupling losses between the coupling fiber and single mode transmission fiber is the comparable mode field diameters, although this is a necessary but not sufficient condition. The mode field diameter of the LP01 mode in the coupling fiber at 1310 nm may be between 8.6 µm and 10.0 µm, or between 8.8 µm and 9.6 µm, or between 8.9 µm and 9.5 µm, or between 9.0 µm and 9.4 µm. The mode field diameter of the LP01 mode in the coupling fiber at 1550 nm may be between 9.6 µm and 11.0 µm, or between 9.8 µm and 10.6 µm, or between 9.9 µm and 10.5 µm, or between 10.0 µm and 10.4 µm. The high etendue of the illustrative coupling fibers further indicates an expectation of low coupling losses between the illustrative coupling fibers and standard multimode transmission fibers and between the illustrative coupling fibers and silicon-photonics transceivers.

The performance characteristics presented in Tables 1B, 2B, and 3B demonstrate that the illustrative coupling fibers exhibit high bandwidth at the targeted operating wavelengths of 1310 nm (Tables 1B and 2B) and 1550 nm (Tables 3B). Attainment of high bandwidth results from designing the relative refractive index profile to minimize the relative time delay between different mode groups at the targeted operating wavelength. High modal bandwidth at operating wavelengths of 1310 nm or 1550 nm is especially desirable for optical data links because of the favorability of the two wavelengths for optical signal propagation in silica-based optical fibers. The effective modal bandwidth of certain embodiments of the present coupling fibers at 1310 nm is at least 1.5 GHz-km, or at least 2 GHz-km, or at least 3 GHz-km, or at least 4 GHz-km, or at least 8 GHz-km, or at least 16 GHz-km, or in the range from 2 GHz-km-40 GHz-km, or in the range from 4 GHz-km-30 GHz-km, or in the range from 8 GHz-km-20 GHz-km. The effective modal bandwidth of certain embodiments of the present coupling fibers at 1550 nm is at least 1.5 GHz-km, or at least 2 GHz-km, or at least 3 GHz-km, or at least 4 GHz-km, or at least 8 GHz-km, or at least 16 GHz-km, or in the range from 2 GHz-km-40 GHz-km, or in the range from 4 GHz-km-30 GHz-km, or in the range from 8 GHz-km-20 GHz-km.

While not wishing to be bound by theory, it is believed that inclusion of a depressed index cladding region in the relative refractive index profile and the design of the characteristics of the relative refractive index profile specific to the targeted operating wavelength contributes to high bandwidth at the targeted operating wavelength. Unexpectedly high bandwidth as a function of operating wavelength was observed in the present coupling fibers. Tables 1B and 2B, for example, indicate that the illustrative coupling fibers (Examples 1-8) have much higher bandwidth at 1310 nm than at several similar wavelengths (1270 nm, 1290 nm, and 1330 nm). However the bandwidth across the wavelength range from 1270 nm to 1330 nm remains sufficiently high to enable wavelength division multiplexing of two or more optical signals. The minimum effective modal bandwidth of certain embodiments of the present coupling fibers across the 1270 to 1330 nm wavelength range is at least 1 GHz-km, or at least 2 GHz-km, or at least 3 GHz-km, or at least 4 GHz-km, or in the range from 1 GHz-km-20 GHz-km, or in the range from 1 GHz-km-10 GHz-km, or in the range from 2 GHz-km-8 GHz-km.

Table 3B similarly shows that the illustrative coupling fibers (Examples 9-14) have much higher bandwidth at 1550 nm than at similar wavelengths (1530 nm and 1570 nm). However the bandwidth across the wavelength range from 1530 nm to 1570 nm remains sufficiently high to enable wavelength division multiplexing of two or more optical signals. The minimum effective modal bandwidth of certain embodiments of the present coupling fibers across the 1530 nm to 1570 nm wavelength range is at least 1 GHz-km, or at least 2 GHz-km, or at least 3 GHz-km, or at least 4 GHz-km, or in the range from 1 GHz-km-20 GHz-km, or in the range from 1 GHz-km-10 GHz-km, or in the range from 2 GHz-km-8 GHz-km.

In certain embodiments, it is further noted that one or more of the above stated bandwidth performance specifications can be achieved in coupling fibers having high etendue. The etendue of the coupling fiber may be at least 40 µm$^2$, or at least 50 µm$^2$, or at least 60 µm$^2$, or at least 70 µm$^2$, or between 40 µm$^2$ and 80 µm$^2$, or between 50 µm$^2$ and 80 µm$^2$, or between 50 µm$^2$ and 75 µm$^2$, or between 55 µm$^2$ and 80 µm$^2$.

Examples 15-30 illustrate fibers with graded index core profiles that are mode-matched to standard single mode fiber. The relative refractive index profiles of the Examples 15-30 are of the type shown in FIG. 9 and included a core region with an α-profile and a cladding region. Examples 15-22 provide modal and overfilled bandwidth greater than 4 GHz-km at 1310 nm. Examples 23-26 provide modal and overfilled bandwidth greater than 4 GHz-km at 850 nm. Examples 27-30 provide modal and overfilled bandwidth greater than 0.5 GHz-km at both 850 nm and 1310 nm.

The modeled characteristics of the relative refractive index profile of Examples 15-30 are included in Tables 4A, 5A, and 6A: $\Delta_{1max}$, expressed in units of %, corresponds to the maximum value of relative refractive index for the α-profile in the core region. For Examples 15-30, $\Delta_{1max}$ occurs at the centerline (r=0) position of the coupling fiber. $r_1$, expressed in units of microns, is the outer radial position of the core region. For Examples 15-30, $r_1$ corresponds to $r_z$, the radial position of the core α-profile at which Δ=0. α corresponds to the value of α for the relative refractive index profile of the core. $\Delta_4$ is the relative refractive index of the cladding region and $r_4$ is the outer radius of the cladding region. $r_4$ is equal to 40.0 µm in each of Examples 15-30.

Tables 4B, 5B, and 6B summarize modeled performance characteristics for the fibers having the relative refractive index profile parameters listed in Tables 4A, 5A, and 6A, respectively. The performance characteristics include effective modal bandwidth (EMB) (expressed in units of GHz-km) at various indicated wavelengths and mode field diameter (MFD) (expressed in units of microns) for the LP01 mode at various indicated wavelengths.

TABLE 4A

Relative Refractive Index Characteristics of Illustrative Coupling Fibers

| | Examples | | | | | | | |
|---|---|---|---|---|---|---|---|---|
| | 15 | 16 | 17 | 18 | 19 | 20 | 21 | 22 |
| $\Delta_{1max}$ (%) | 1.90 | 1.99 | 2.00 | 2.02 | 2.09 | 2.11 | 2.16 | 2.26 |
| $r_1$ (µm) | 13.41 | 14.21 | 13.46 | 16.82 | 16.42 | 13.84 | 16.27 | 15.93 |
| α | 2.041 | 2.056 | 2.037 | 2.038 | 2.039 | 2.041 | 2.037 | 2.040 |

TABLE 4A-continued

Relative Refractive Index Characteristics of Illustrative Coupling Fibers

| | Examples | | | | | | | |
|---|---|---|---|---|---|---|---|---|
| | 15 | 16 | 17 | 18 | 19 | 20 | 21 | 22 |
| $\Delta_4$ (%) | 0 | 0 | 0 | 0 | 0 | 0 | 0 | 0 |
| $r_4$ (μm) | 40.0 | 40.0 | 40.0 | 40.0 | 40.0 | 40.0 | 40.0 | 40.0 |

TABLE 4B

Performance Characteristics of Illustrative Coupling Fibers

| | Examples | | | | | | | |
|---|---|---|---|---|---|---|---|---|
| | 15 | 16 | 17 | 18 | 19 | 20 | 21 | 22 |
| EMB at 850 nm (GHz-km) | 0.269 | 0.325 | 0.269 | 0.269 | 0.255 | 0.255 | 0.240 | 0.226 |
| EMB at 1310 nm (GHz-km) | 10.00 | 9.21 | 9.76 | 10.00 | 8.75 | 8.75 | 8.64 | 8.99 |
| LP01 MFD at 1310 nm (μm) | 8.86 | 9.03 | 8.58 | 9.76 | 9.56 | 8.58 | 9.41 | 8.46 |
| LP01 MFD at 1550 nm (μm) | 9.65 | 9.83 | 9.53 | 10.63 | 10.41 | 9.53 | 10.27 | 10.04 |

TABLE 5A

Relative Refractive Index Characteristics of Illustrative Coupling Fibers

| | Examples | | | |
|---|---|---|---|---|
| | 23 | 24 | 25 | 26 |
| $\Delta_{1max}$ (%) | 1.76 | 1.90 | 1.92 | 2.08 |
| $r_1$ (μm) | 16.24 | 17.49 | 15.49 | 14.71 |
| α | 2.134 | 2.135 | 2.137 | 2.141 |
| $\Delta_4$ (%) | 0 | 0 | 0 | 0 |
| $r_4$ (μm) | 40.0 | 40.0 | 40.0 | 40.0 |

TABLE 5B

Performance Characteristics of Illustrative Coupling Fibers

| | Examples | | | |
|---|---|---|---|---|
| | 23 | 24 | 25 | 26 |
| EMB at 850 nm (GHz-km) | 23.32 | 20.25 | 19.87 | 15.43 |
| EMB at 1310 nm (GHz-km) | 0.45 | 0.354 | 0.410 | 0.368 |
| LP01 MFD at 1310 nm (μm) | 10.12 | 10.33 | 9.68 | 9.24 |
| LP01 MFD at 1550 nm (μm) | 11.02 | 11.23 | 10.52 | 10.04 |

TABLE 6A

Relative Refractive Index Characteristics of Illustrative Coupling Fibers

| | Examples | | | |
|---|---|---|---|---|
| | 27 | 28 | 29 | 30 |
| $\Delta_{1max}$ (%) | 1.77 | 1.94 | 2.00 | 2.09 |
| $r_1$ (μm) | 14.85 | 15.89 | 15.34 | 15.56 |
| α | 2.093 | 2.098 | 2.094 | 2.101 |
| $\Delta_4$ (%) | 0 | 0 | 0 | 0 |
| $r_4$ (μm) | 40.0 | 40.0 | 40.0 | 40.0 |

TABLE 6B

Performance Characteristics of Illustrative Coupling Fibers

| | Examples | | | |
|---|---|---|---|---|
| | 27 | 28 | 29 | 30 |
| EMB at 850 nm (GHz-km) | 0.74 | 0.68 | 0.61 | 0.66 |
| EMB at 950 nm (GHz-km) | 2.02 | 3.20 | 1.99 | 4.03 |
| EMB at 980 nm (GHz-km) | 4.10 | 8.53 | 5.02 | 3.72 |
| EMB at 1060 nm (GHz-km) | 1.40 | 1.82 | 1.64 | 1.26 |
| EMB at 1310 nm (GHz-km) | 0.85 | 0.69 | 0.72 | 0.62 |
| LP01 MFD at 1310 nm (μm) | 9.59 | 9.70 | 9.44 | 9.39 |
| LP01 MFD at 1550 nm (μm) | 10.43 | 10.55 | 10.28 | 10.24 |

Figure 12:
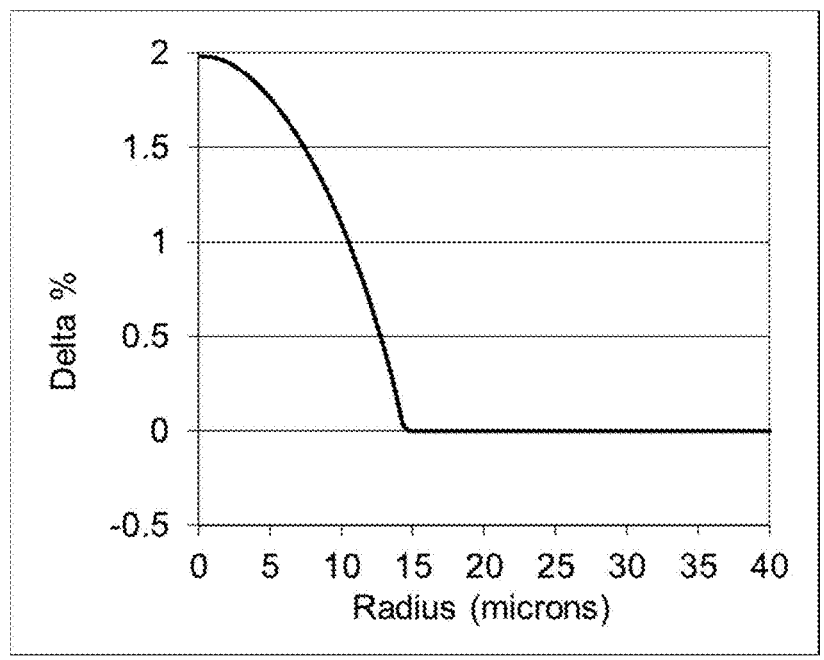
FIG. 12 shows the measured relative refractive index profile of a fabricated coupling fiber in accordance with the present specification.
Figure 13:
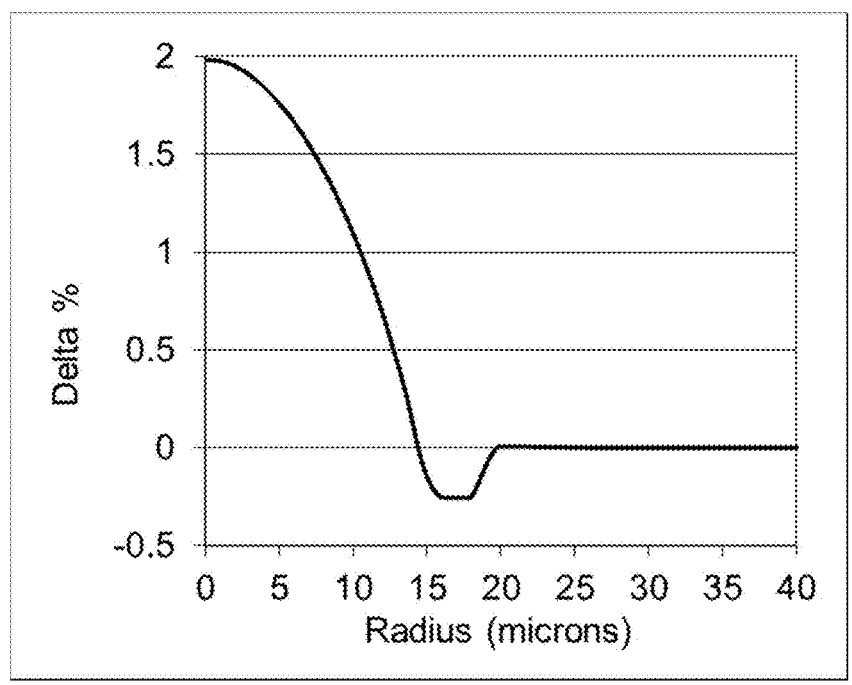
FIG. 13 shows the measured relative refractive index profile of a fabricated coupling fiber in accordance with the present specification.

Examples 31-36 are fabricated fiber samples having characteristics similar to those described for Examples 1-30. The measured relative refractive index profile of Example 31 is shown in FIG. 12. Examples 32 and 33 had similar relative refractive index profiles. The measured relative refractive index profile of Example 35 is shown in FIG. 13. Examples 34 and 36 have relative refractive index profiles that are similar to Example 35.

The measured characteristics of the relative refractive index profile of Examples 31-33 are included in Table 7A: $\Delta_{1max}$, expressed in units of %, corresponds to the maximum value of relative refractive index for the α-profile in the core region. For Examples 31-33, $\Delta_{1max}$ occurs at the centerline (r=0) position of the coupling fiber. $r_1$, expressed in units of microns, is the outer radial position of the core region. For Examples 31-33, $r_1$ corresponds to $r_z$, the radial position of the core α-profile at which Δ=0. α corresponds to the value of α for the relative refractive index profile of the core. $\Delta_4$ is the relative refractive index of the cladding region and $r_4$ is the outer radius of the cladding region. $r_4$ is equal to 40.0 μm in each of Examples 31-33.

Table 7B summarizes measured performance characteristics for the fibers having the relative refractive index profile parameters listed in Table 7A. The performance characteristics include OTDR (optical time domain reflectrometry) measurements at 1310 nm and 1550 nm (expressed in units of dB/km), and overfilled bandwidth (OFLBW) measurements at 850 nm and 1300 nm (expressed in units of MHz-km).

TABLE 7A

Relative Refractive Index Characteristics of Illustrative Coupling Fibers

| | Examples | | |
|---|---|---|---|
| | 31 | 32 | 33 |
| $\Delta_{1max}$ (%) | 1.893 | 1.855 | 1.864 |
| $r_1$ (μm) | 14.56 | 14.53 | 15.90 |
| α | 2.066 | 2.049 | 2.035 |
| $\Delta_4$ (%) | 0 | 0 | 0 |
| $\Delta_4$ (μm) | 40.0 | 40.0 | 40.0 |
| Length (m) | 6000 | 3567 | 5000 |

TABLE 7B

Performance Characteristics of Illustrative Coupling Fibers

| | Examples | | |
|---|---|---|---|
| | 31 | 32 | 33 |
| OTDR at 1310 nm (dB/km) | 0.694 | 0.653 | 0.808 |
| OTDR at 1550 nm (dB/km) | 0.415 | 0.370 | 0.528 |
| OFLBW at 850 nm (MHz-km) | 335 | 270 | 329 |
| OFLBW at 1300 nm (MHz-km) | 4983 | 3523 | 4691 |

The measured relative refractive index characteristics of Examples 34-36 are included in Table 8A: $\Delta_{1max}$, expressed in units of %, corresponds to the maximum value of relative refractive index for the α-profile in the core region. For Examples 34-36, $\Delta_{1max}$ occurs at the centerline (r=0) position of the coupling fiber. $r_1$, expressed in units of microns, is the outer radial position of the core region. For Examples 34-36, $r_1$ corresponds to $r_z$, the radial position of the core α-profile at which Δ=0. α corresponds to the value of α for the relative refractive index profile of the core. $r_1'$, expressed in units of microns, corresponds to the inner radius of the depressed index cladding region. $r_3$, expressed in units of microns, corresponds to the outer radius of the depressed index cladding region. $\Delta_3$ is the relative refractive index of the depressed index cladding region. For Examples 34-36, the depressed index cladding region has an approximately constant relative refractive index value between the transition regions with the core region and outer cladding regions. $\Delta_4$ is the relative refractive index of the outer cladding region and $r_4$ is the outer radius of the outer cladding region and is equal to 40.0 μm in each of Examples 34-36.

Because the transition region from the core region to the depressed index cladding region is sloped, the inner radius $r_1'$ of the depressed index cladding region differs from the outer radius $r_1$ of the core region. $r_1'$ is selected as the radial position corresponding to half of the depth of the depressed index cladding region. Similarly, the outer radius $r_3$ of the depressed index cladding region is selected as the radial position corresponding to half of the depth of the depressed index cladding region. For Examples 34-36, the depth of the depressed index cladding region is $\Delta_3$ and the radial position corresponding to half depth is the radial position corresponding to ½$\Delta_3$. $r_1'$ is the position of half depth adjacent the core region and $r_3$ is the position of half depth adjacent the outer cladding region.

Table 8B summarizes measured performance characteristics for the fibers having the relative refractive index profile parameters listed in Table 8A. The performance characteristics include OTDR (optical time domain reflectrometry) measurements at 1310 nm and 1550 nm (expressed in units of dB/km), and overfilled bandwidth (OFLBW) measurements at 850 nm and 1300 nm (expressed in units of MHz-km).

TABLE 8A

Relative Refractive Index Characteristics of Illustrative Coupling Fibers

| | Examples | | |
|---|---|---|---|
| | 34 | 35 | 36 |
| $\Delta_{1max}$ (%) | 2.072 | 1.978 | 1.912 |
| $r_1$ (μm) | 14.63 | 14.70 | 14.77 |
| α | 2.100 | 2.076 | 2.052 |
| $\Delta_3$ (%) | −0.20 | −0.25 | −0.32 |
| $r_1'$ (μm) | 14.8 | 14.9 | 15.0 |
| $r_3$ (μm) | 18.9 | 18.8 | 18.9 |
| $\Delta_4$ (%) | 0 | 0 | 0 |
| $r_4$ (μm) | 40.0 | 40.0 | 40.0 |
| Length | 4087 | 4083 | 4084 |

TABLE 8B

Performance Characteristics of Illustrative Coupling Fibers

| | Examples | | |
|---|---|---|---|
| | 34 | 35 | 36 |
| OTDR at 1310 nm (dB/km) | 0.709 | 0.632 | 0.659 |
| OFLBW at 850 nm (MHz-km) | 823 | 1992 | 527 |
| OFLBW at 1300 nm (MHz-km) | 348 | 577 | 1145 |

The measured relative refractive index characteristics of Examples 37-38 are included in Table 9A: $\Delta_{1max}$, expressed in units of %, corresponds to the maximum value of relative refractive index for the α-profile in the core region. For Examples 37-38, $\Delta_{1max}$ occurs at the centerline (r=0) position of the coupling fiber. $r_1$, expressed in units of microns, is the outer radial position of the core region. For Examples 37-38, $r_1$ corresponds to $r_z$, the radial position of the core α-profile at which Δ=0. α corresponds to the value of α for the relative refractive index profile of the core. $\Delta_4$ is the relative refractive index of the outer cladding region and $r_4$ is the outer radius of the outer cladding region and is equal to 39.0 μm in each of Examples 37-38.

Table 9B summarizes measured performance characteristics for the fibers having the relative refractive index profile parameters listed in Table 9A. The performance characteristics include OTDR (optical time domain reflectrometry) measurements at 1310 nm and 1550 nm (expressed in units of dB/km), and overfilled bandwidth (OFLBW) measurements at 850 nm and 1300 nm (expressed in units of MHz-km).

TABLE 9A

Relative Refractive Index Characteristics of Illustrative Coupling Fibers

| | Example | |
|---|---|---|
| | 37 | 38 |
| $\Delta_{1max}$ (%) | 1.039 | 1.018 |
| $r_1$ (µm) | 18.0 | 18.2 |
| α | 2.110 | 2.109 |
| $\Delta_4$ (%) | 0 | 0 |
| $r_4$ (µm) | 39.0 | 39.0 |
| Length | 3570 | 3500 |

TABLE 9B

Performance Characteristics of Illustrative Coupling Fibers

| | Example | |
|---|---|---|
| | 37 | 38 |
| OTDR at 1310 nm (dB/km) | 3.93 | 3.61 |
| OFLBW at 850 nm (MHz-km) | 2866 | 1513 |
| OFLBW at 1300 nm (MHz-km) | 410 | 399 |

Table 10B summarizes modeled performance characteristics for the fibers having the relative refractive index profile parameters listed in Table 10A. The performance characteristics include effective modal bandwidth (EMB) (expressed in units of GHz-km) at various indicated wavelengths and mode field diameter (MFD) (expressed in units of microns) for the LP01 mode at various indicated wavelengths.

TABLE 10A

Relative Refractive Index Characteristics of Illustrative Coupling Fibers

| | Examples | | | | | |
|---|---|---|---|---|---|---|
| | 39 | 40 | 41 | 42 | 43 | 44 |
| $\Delta_{1max}$ (%) | 0.98 | 1.12 | 0.99 | 0.8 | 0.86 | 1 |
| $r_1$ (µm) | 19.61 | 20.58 | 19.97 | 20.85 | 20.23 | 20.53 |
| α | 2.012 | 2.011 | 2.048 | 2.049 | 2.104 | 2.103 |
| $\Delta_4$ (%) | 0 | 0 | 0 | 0 | 0 | 0 |
| $r_4$ (µm) | 40 | 40 | 40 | 40 | 40 | 40 |

TABLE 10B

Performance Characteristics of Illustrative Coupling Fibers

| | Examples | | | | | |
|---|---|---|---|---|---|---|
| | 39 | 40 | 41 | 42 | 43 | 44 |
| EMB at 850 nm (GHz-km) | 0.62 | 0.54 | 0.98 | 1.24 | 33.61 | 22.43 |
| EMB at 1064 nm (GHz-km) | 1.43 | 1.26 | 29.23 | 27.12 | 1.06 | 1.05 |
| EMB at 1310 nm (GHz-km) | 26.91 | 24.94 | 1.36 | 1.20 | 0.55 | 0.55 |
| NA | 0.205 | 0.220 | 0.206 | 0.185 | 0.192 | 0.207 |
| LP01 MFD at 1310 nm (µm) | 12.71 | 12.57 | 12.89 | 13.93 | 13.58 | 14.31 |

TABLE 10B-continued

Performance Characteristics of Illustrative Coupling Fibers

| | Examples | | | | | |
|---|---|---|---|---|---|---|
| | 39 | 40 | 41 | 42 | 43 | 44 |
| LP01 MFD at 1550 nm (µm) | 13.84 | 13.69 | 14.01 | 15.13 | 14.76 | 14.31 |
| Etendue (µm²) | 50.9 | 64.3 | 53.4 | 46.8 | 47.5 | 57.0 |

The coupling fiber may include a coating consisting of a single layer or a coating that includes two or more layers that surrounds the outer cladding region. The coating is selected to minimize microbending losses and/or to provide mechanical integrity to the coupling fiber. The coating or layer is prepared from a curable coating composition.

In one embodiment, the coating includes a low modulus layer and a high modulus layer, where the high modulus layer surrounds the low modulus layer and the low modulus layer surrounds the outer cladding region. The low modulus layer may be referred to herein as a primary layer or primary coating. The high modulus layer may be referred to herein as a secondary layer or secondary coating.

The coating may be directly adjacent the outer cladding region and may extend from the outer radius $r_4$ of the outer cladding region to an outer radius $r_5$. The outer radius $r_5$ of the coating may be less than 110 µm, or less than 100 µm, or less than 90 µm, or less than 80 µm, or in the range from 60 µm-110 µm, or in the range from 65 µm-100 µm, or in the range from 65 µm-95 µm or in the range from 65 µm-90 µm, or in the range from 70 µm-95 µm. The thickness of the coating may be less than 60 µm, or less than 55 µm, or less than 50 µm, or less than 45 µm, or in the range from 20 µm-60 µm, or in the range from 25 µm-50 µm, or in the range from 25 µm-45 µm or in the range from 30 µm-45 µm.

In one embodiment, the coating is a single layer having an outer radius $r_5$. In another embodiment, the coating includes a primary layer and a secondary layer, where the secondary layer surrounds the primary layer and has an outer radius $r_5$ and where the primary layer surrounds the outer cladding region and has an outer radius $r_5'$ intermediate between $r_4$ and $r_5$. In another embodiment, the coating includes three or more layers, the outermost of which has an outer radius $r_5$. The radius $r_5$ also corresponds to the outer radius of the coupling fiber.

In embodiments in which the coating is a single layer, the coating has a high modulus. In embodiments in which the coating includes a primary layer and a secondary layer, the secondary layer may have properties and a composition corresponding to the single layer coating embodiment. As used herein, modulus refers to Young's modulus. For high modulus single layer coatings and the high modulus secondary layer of a two-layer coating, the Young's modulus is reported herein for the coating or layer configured as a cured rod according to the following description: Rods were prepared by injecting samples of the curable composition into Teflon® tubing having an inner diameter of about 0.022". The samples were cured using a Fusion D bulb at a dose of about 2.4 J/cm² (measured over a wavelength range of 225-424 nm by a Light Bug model IL390 from International Light). After curing, the Teflon® tubing was stripped away. The cured rods were allowed to condition overnight at 23° C. and 50% relative humidity. After curing the rod diameter was about 0.022". Properties such as Young's modulus, tensile strength, and % elongation at break for the cured rods formed from the curable composition were measured using a tensile testing instrument (e.g., a Sintech MTS Tensile Tester, or an Instron Universal Material Test System) on the cured rod samples. The gauge length of the testing instrument was 51 mm, and the test speed was 250 mm/min. Properties were determined as an average of five samples, with outlying data points and obviously defective rod samples being excluded from the average.

The coating or secondary layer has a Young's modulus, when configured as a cured rod having a diameter of about 0.022" of at least about 1200 MPa, or at least about 1300 MPa, or at least about 1400 MPa, or at least about 1500 MPa, or at least about 1600 MPa, or at least about 1700 MPa, or at least about 1800 MPa. The coating or secondary layer, when configured as a cured rod having a diameter of about 0.022", has an elongation to break of at least about 30%, preferably at least about 40%. The coating or secondary layer, when configured as a cured rod having a diameter of about 0.022", has an average tensile strength of at least about 45 MPa, more preferably at least about 50 or 55 MPa, most preferably at least about 60 MPa. The glass transition temperature ($T_g$) of the coating or secondary layer, when configured as a cured rod having a diameter of about 0.022", is preferably between about 50° C. and about 120° C., more preferably between about 50° C. and about 100° C.

The curable composition used to form the coating or secondary layer is preferably a curable liquid composition or a radiation-curable liquid composition. The radiation-curable composition may include one or more monomers, one or more oligomers, and one or more photoinitiators. The radiation-curable composition may also optionally include additives such as anti-oxidants, optical brighteners, catalyst (s), a carrier or surfactant, and a stabilizer.

The radiation-curable composition may lack an oligomer. Although not required, it is preferable that the monomeric component be a combination of two or more monomers when the composition is devoid of an oligomeric component.

Preferably, the monomeric component of the radiation-curable composition includes ethylenically unsaturated monomer(s). While the monomeric component can be present in an amount of 50 wt % or more, it is preferably present in an amount of about 75 to about 99.2 wt %, more preferably about 80 to about 99 wt %, and most preferably about 85 to about 98 wt %.

In one embodiment, the radiation-curable composition includes one or more ethylenically unsaturated monomers. Ethylenically unsaturated monomers may contain various functional groups which enable their crosslinking upon curing. The ethylenically unsaturated monomers are preferably polyfunctional (i.e., each containing two or more functional groups), although monofunctional monomers can also be introduced into the composition. Therefore, the ethylenically unsaturated monomer can be a polyfunctional monomer, a monofunctional monomer, and mixtures thereof. Suitable functional groups for ethylenically unsaturated monomers used in accordance with the present invention include, without limitation, acrylates, methacrylates, acrylamides, N-vinyl amides, styrenes, vinyl ethers, vinyl esters, acid esters, and combinations thereof (i.e., for polyfunctional monomers).

Suitable polyfunctional ethylenically unsaturated monomers for the radiation-curable composition include, without limitation, alkoxylated bisphenol A diacrylates such as ethoxylated bisphenol A diacrylate with ethoxylation being 2 or greater, preferably ranging from 2 to about 30 (e.g. SR349 and SR601 available from Sartomer Company, Inc. (West Chester, Pa.) and Photomer 4025 and Photomer 4028, available from IGM Resins, Inc. (Charlotte, N.C.)), and propoxylated bisphenol A diacrylate with propoxylation being 2 or greater, preferably ranging from 2 to about 30; methylolpropane polyacrylates with and without alkoxylation such as ethoxylated trimethylolpropane triacrylate with ethoxylation being 3 or greater, preferably ranging from 3 to about 30 (e.g., Photomer 4149, IGM Resins, Inc., and SR499, Sartomer Company, Inc.), propoxylated-trimethylolpropane triacrylate with propoxylation being 3 or greater, preferably ranging from 3 to 30 (e.g., Photomer 4072, Cognis Corp: and SR492, Sartomer), and ditrimethylolpropane tetraacrylate (e.g., Photomer 4355, IGM Resins, Inc.); alkoxylated glyceryl triacrylates such as propoxylated glyceryl triacrylate with propoxylation being 3 or greater (e.g., Photomer 4096, IGM Resins, Inc. and SR9020, Sartomer); erythritol polyacrylates with and without alkoxylation, such as pentaerythritol tetraacrylate (e.g., SR295, available from Sartomer Company, Inc. (West Chester, Pa.)), ethoxylated pentaerythritol tetraacrylate (e.g., SR494, Sartomer Company, Inc.), and dipentaerythritol pentaacrylate (e.g., Photomer 4399, IGM Resins, Inc., and SR399, Sartomer Company, Inc.); isocyanurate polyacrylates formed by reacting an appropriate functional isocyanurate with an acrylic acid or acryloyl chloride, such as tris-(2-hydroxyethyl) isocyanurate triacrylate (e.g., SR368, Sartomer Company, Inc.) and tris-(2-hydroxyethyl) isocyanurate diacrylate; alcohol polyacrylates with and without alkoxylation such as tricyclodecane dimethanol diacrylate (e.g., CD406, Sartomer Company, Inc.) and ethoxylated polyethylene glycol diacrylate with ethoxylation being 2 or greater, preferably ranging from about 2 to 30; epoxy acrylates formed by adding acrylate to bisphenol A diglycidylether (4 up) and the like (e.g., Photomer 3016, IGM Resins, Inc.); and single and multi-ring cyclic aromatic or non-aromatic polyacrylates such as dicyclopentadiene diacrylate and dicyclopentane diacrylate.

It may also be desirable to use certain amounts of monofunctional ethylenically unsaturated monomers, which can be introduced to influence the degree to which the cured product absorbs water, adheres to other coating materials, or behaves under stress. Exemplary monofunctional ethylenically unsaturated monomers include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, octadecyl acrylate, and stearyl acrylate; aminoalkyl acrylates such as dimethylaminoethyl acrylate, diethylaminoethyl acrylate, and 7-amino-3,7-dimethyloctyl acrylate; alkoxyalkyl acrylates such as butoxyethyl acrylate, phenoxyethyl acrylate (e.g., SR339, Sartomer Company, Inc.), and ethoxyethoxyethyl acrylate; single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bomyl acrylate, isobornyl acrylate (e.g., SR423, Sartomer Company, Inc.), tetrahydrofurfuryl acrylate (e.g., SR285, Sartomer Company, Inc.), caprolactone acrylate (e.g., SR495, Sartomer Company, Inc.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4) nonylphenol acrylate (e.g., Photomer 4003, IGM Resins, Inc.); acrylamides such as diacetone acrylamide, isobutoxymethyl acrylamide, N,N'-dimethyl-aminopropyl acrylamide, N,N-dimethyl acrylamide, N,N diethyl acrylamide, and t-octyl acrylamide; vinylic compounds such as N-vinylpyrrolidone and N-vinylcaprolactam; and acid esters such as maleic acid ester and fumaric acid ester. With respect to the long and short chain alkyl acrylates listed above, a short chain alkyl acrylate is an alkyl group with 6 or less carbons and a long chain alkyl acrylate is alkyl group with 7 or more carbons.

The optional oligomeric component of the radiation-curable composition can include a single oligomer or a combination of two or more oligomers. The one or more optional oligomers may include one or more monofunctional oligomers, one or more polyfunctional oligomers, or a combination thereof. Preferable oligomer(s) includes ethylenically unsaturated oligomer(s). Optional oligomers include aliphatic and aromatic urethane (meth)acrylate oligomers, urea (meth)acrylate oligomers, polyester and polyether (meth)acrylate oligomers, acrylated acrylic oligomers, polybutadiene (meth)acrylate oligomers, polycarbonate (meth)acrylate oligomers, and melamine (meth)acrylate oligomers.

The radiation-curable composition includes a polymerization initiator. The polymerization initiator is a reagent that is suitable to cause polymerization (i.e., curing) of the composition after its application to a glass fiber. Polymerization initiators suitable for use in the radiation-curable compositions include thermal initiators, chemical initiators, electron beam initiators, and photoinitiators. Photoinitiators are the preferred polymerization initiators. For most acrylate-based coating formulations, conventional photoinitiators, such as the known ketonic photoinitiators and/or phosphine oxide photoinitiators, are preferred. Photoinitiators are reactive components and undergo reaction, rearrangement, or decomposition to provide chemical species (e.g. free radicals) capable of initiating a photoreaction with a curable component of the coating composition. When used in the present radiation-curable compositions, the photoinitiator is present in an amount sufficient to provide rapid ultraviolet curing. The radiation-curable composition may include one or more photoinitiators. The concentration of photoinitiator(s) may be between about 0.25 wt % to about 10.0 wt %, or between about 0.5 wt % and 7.5 wt %, or between about 0.75 wt % and 5.0 wt %.

Suitable photoinitiators include, without limitation, 1-hydroxycyclohexyl-phenyl ketone (e.g. Irgacure 184 available from BASF), (2,6-dimethoxybenzoyl)-2,4,4-trimethylpentyl phosphine oxide (e.g. commercial blends Irgacure 1800, 1850, and 1700 available from BASF), 2,2-dimethoxyl-2-phenyl acetophenone (e.g. Irgacure 651, available from BASF), bis(2,4,6-trimethyl benzoyl)phenyl-phosphine oxide (e.g. Irgacure 819, available from BASF), (2,4,6-trimethylbenzoyl)diphenyl phosphine oxide (e.g. Lucirin TPO available from BASF, Munich, Germany), ethoxy(2,4,6-trimethylbenzoyl)phenyl phosphine oxide (e.g. Lucirin TPO-L from BASF), and combinations thereof.

The radiation-curable composition may also optionally include one or more additives. The one or more additives optionally include an adhesion promoter, an antioxidant, a catalyst, a carrier or surfactant, a tackifier, a stabilizer, an optical brightener or a UV absorber. Some additives (e.g., catalysts, reactive surfactants, and optical brighteners) may operate to control the polymerization process and may thereby affect the physical properties (e.g., modulus, glass transition temperature) of the cured product formed from the coating composition. Other additives may influence the integrity of the cured product of the coating composition (e.g., protection against UV-induced curing or oxidative degradation).

An adhesion promoter enhances the adhesion of the coating to an underlying glass fiber. Examples of suitable adhesion promoters include, without limitation, organofunctional silanes, titanates, zirconates, and mixtures thereof. One preferred class are the poly(alkoxy)silanes. Suitable alternative adhesion promoters include, without limitation, bis(trimethoxysilylethyl)-benzene, 3-mercaptopropyltrimethoxy-silane (3-MPTMS, available from United Chemical Technologies, Bristol, Pa.; also available from Gelest, Morrisville, Pa.), 3-acryloxypropyl-trimethoxysilane (available from Gelest), and 3-methacryloxypropyl-trimethoxysilane (available from Gelest), and bis(trimethoxysilylethyl) benzene (available from Gelest). Other adhesion promoters are described in U.S. Pat. Nos. 4,921,880 and 5,188,864 to Lee et al., each of which is hereby incorporated by reference. The adhesion promoter, if present, is used in an amount between about 0.1 to about 10 pph, more preferably about 0.25 to about 3 pph.

Suitable antioxidants include, without limitation, bis hindered phenolic sulfide or thiodiethylene bis(3,5-di-tert-butyl)-4-hydroxyhydrocinnamate (e.g. Irganox 1035, available from BASF), 2,6-di-t-butyl-4-methylphenol (BHT) and MEHQ (monomethyl ether hydroquinone). The antioxidant, if present, is used in an amount between about 0.1 to about 3 pph, more preferably about 0.25 to about 2 pph.

An exemplary catalyst is a tin catalyst, such as dibutyltin dilaurate, which is used to catalyze the formation of urethane bonds in some non-radiation curable components. Whether the catalyst remains as an additive of the non-radiation curable component or additional quantities of the catalyst are introduced into the composition, the presence of the catalyst may act to stabilize the non-radiation curable component(s) in the composition. Any tendency of excess tin catalyst to destabilize the silane adhesion promoter can be counteracted by addition of tetrathiol.

Suitable carriers, more specifically carriers that function as reactive surfactants, include polyalkoxypolysiloxanes. Exemplary preferred carriers are available from Goldschmidt Chemical Co. (Hopewell, Va.) under the tradename TEGORAD 2200 and TEGORAD 2700 (acrylated siloxane). These reactive surfactants may be present in a preferred amount between about 0.01 pph to about 5 pph, more preferably about 0.25 pph to about 3 pph. Other classes of suitable carriers are polyols and non-reactive surfactants. Examples of suitable polyols and non-reactive surfactants include, without limitation, the polyol Acclaim 3201 (poly (ethylene oxide-co-propylene oxide)) available from Bayer (Newtown Square, Pa.), and the non-reactive surfactant Tegoglide 435 (polyalkoxy-polysiloxane) available from Goldschmidt Chemical Co. The polyol or non-reactive surfactants may be present in a preferred amount between about 0.01 pph to about 10 pph, more preferably about 0.05 pph to about 5 pph, most preferably about 0.1 pph to about 2.5 pph.

Suitable stabilizers include tetrafunctional thiols, e.g., pentaerythritol tetrakis(3-mercaptopropionate) from Sigma-Aldrich (St. Louis, Mo.). The stabilizer, if present, is used in an amount between about 0.01 pph to about 1 pph, more preferably about 0.01 pph to about 0.2 pph.

Exemplary optical brighteners include, without limitation, Uvitex OB, a 2,5-thiophenediylbis(5-tert-butyl-1,3-benzoxazole) (BASF); Blankophor KLA, available from Bayer;

bisbenzoxazole compounds; phenylcoumarin compounds; and bis(styryl)biphenyl compounds. The optical brightener is desirably present in the composition at a concentration of about 0.003 pph to about 0.5 pph, more preferably about 0.005 pph to about 0.3 pph.

The coating or secondary layer may also include a pigment. A pigment provides coloration that permits identification of the fiber. Unambiguous identification of individual fibers is important when multiple fibers are configured as a bundle. A common strategy for increasing data transmission, for example, is to bundle multiple optical fibers in a cable. To increase data transmission, it is desirable to maximize the number of optical fibers bundled in a cable. During use and installation of cables, it is often necessary to join multiple cables together to increase cable length to meet the needs of an application. Since each fiber in a bundle is dedicated to a distinct data channel, it is necessary to identify individual fibers in a bundle to insure proper connection of data channels when cables are joined. Marking fibers with different colors by pigmentation of the outermost coating is one strategy for uniquely identifying fibers. Standard pigment colors include blue, orange, green, brown, slate, white, red, black, yellow, violet, rose and aqua.

Pigments of various colors are known in the art and are available from commercial sources. Penn Color (Doylestown, Pa.), for example, provides energy-curable pigment dispersions that can be included in the radiation-curable or secondary layer composition. The dispersions include a suspension of colored particles in a curable liquid suspension medium. The energy curable dispersions are curable upon excitation of light of a suitable wavelength (e.g. a UV wavelength). The colored particles are based on $TiO_2$ and other metal oxides or additives designed to provide various colors. The curable liquid suspension medium includes propoxylated neopentyl glycol diacrylate and a solvent. Product numbers for the dispersions of various colors are as follows: white dispersion (9W892), black dispersion (9B385), blue dispersion (9S959D), yellow dispersion (9Y1107), green dispersion (9G944D), red dispersion (9R925), violet dispersion (9S949D), and orange dispersion (9Y804).

In certain embodiments, the coating may include a primary layer in combination with a secondary layer. The primary layer may be the cured product of a primary layer composition that includes a curable crosslinker, a curable diluent, and a polymerization initiator. The primary layer composition may include one or more curable crosslinkers, one or more curable diluents, one or more non-radiation-curable reinforcing agents, and/or one or more polymerization initiators. In one embodiment, the curable crosslinker is essentially free of urethane and urea functional groups.

In one embodiment, the curable crosslinker is a radiation curable component of the primary layer composition, and as such it includes two or more functional groups capable of participating in the covalent bonding or crosslinking of the crosslinker into the polymeric coating. Exemplary functional groups capable of participating in the crosslinking include $\alpha,\beta$-unsaturated ester, amide, imide or vinyl ether groups.

In one embodiment, the curable crosslinker is essentially free of urethane or urea groups. The curable crosslinker may also be essentially free of thiourethane or thiourea groups. By "essentially free" it is preferable that less than 1 weight percent of the curable crosslinker component includes (thio)urethane or (thio)urea groups. In preferred embodiments, less than 0.5 weight percent of the total curable crosslinker component includes (thio)urethane or (thio)urea groups. In one preferred embodiment, the curable crosslinker component is entirely free of both (thio)urethane and (thio)urea groups.

When identifying certain groups, such as urethane and thiourethane groups, or urea and thiourea groups, or isocyanate or thioisocyanate groups, these groups may be generically identified herein as (thio)urethane, (thio)urea, or (thio)isocyanate or di(thio)isocyanate to indicate that the sulfur atom(s) may or may not be present in the group. Such groups may be referred to herein as (thio)groups and components containing (thio)groups may be referred to herein as (thio) components. The present embodiments extend to primary layer coating compositions that include (thio)components with sulfur atom(s) or without sulfur atom(s) in the (thio) functional group as well as compositions that include some (thio)components with sulfur atom(s) and some (thio)components without sulfur atom(s).

In certain embodiments, the curable crosslinker component includes one or more polyols that contain two or more $\alpha,\beta$-unsaturated ester, amide, imide, or vinyl ether groups, or combinations thereof. Exemplary classes of such polyol crosslinkers include, without limitation, polyol acrylates, polyol methacrylates, polyol maleates, polyol fumarates, polyol acrylamides, polyol maleimides or polyol vinyl ethers comprising more than one acrylate, methacrylate, maleate, fumarate, acrylamide, maleimide or vinyl ether group. The polyol moiety of the curable crosslinker can be a polyether polyol, a polyester polyol, a polycarbonate polyol, or a hydrocarbon polyol.

The curable crosslinker component preferably has a molecular weight of between about 150 g/mol and about 15000 g/mol, in some embodiments more preferably between about 200 g/mol and about 9000 g/mol, in some embodiments preferably between about 1000 g/mol and about 5000 g/mol, in other embodiments preferably between about 200 g/mol and about 1000 g/mol. The curable crosslinker may further have a molecular weight in the range from 100 g/mol to 3000 g/mol, or in the range from 150 g/mol to 2500 g/mol, or in the range from 200 g/mol to 2000 g/mol, or in the range from 500 g/mol to 1500 g/mol.

The curable crosslinker component is present in the radiation curable composition in an amount of about 1 wt % to about 20 wt %, or in an amount of about 2 wt % to about 15 wt %, or in an amount of about 3 wt % to about 10 wt %.

The curable diluent is a generally lower molecular weight (e.g., about 120 to 600 g/mol) liquid monomer that is added to the formulation to control the viscosity to provide the fluidity needed to apply the primary layer composition with conventional liquid coating equipment. The curable diluent contains at least one functional group that allows the diluent, upon activation during curing, to link to the polymer formed during the curing process from the curable crosslinker and other curable components. Functional groups that may be present in the curable diluent include, without limitation, acrylate, methacrylate, maleate, fumarate, maleimide, vinyl ether, and acrylamide groups.

Monofunctional diluents will contain only a single reactive (curable) functional group, whereas polyfunctional diluents will contain two or more reactive (curable) functional groups. Whereas the former can link to the polymer network during curing, the latter can form crosslinks within the polymer network.

Suitable polyfunctional ethylenically unsaturated monomer diluents include, without limitation, methylolpropane polyacrylates with and without alkoxylation such as ethoxylated trimethylolpropane triacrylate with the degree of ethoxylation being 3 or greater, preferably ranging from 3 to about 30 (e.g. Photomer 4149 available from IGM Resins, and SR499 available from Sartomer Company, Inc.), propoxylated trimethylolpropane triacrylate with the degree of propoxylation being 3 or greater, preferably ranging from 3 to 30 (e.g. Photomer 4072 available from IGM Resins; and SR492 and SR501 available from Sartomer Company, Inc.), and ditrimethylolpropane tetraacrylate (e.g. Photomer 4355 available from IGM Resins); alkoxylated glyceryl triacrylates such as propoxylated glyceryl triacrylate with the degree of propoxylation being 3 or greater (e.g. Photomer 4096 available from IGM Resins; and SR9020 available from Sartomer Company, Inc.); erythritol polyacrylates with and without alkoxylation, such as pentaerythritol tetraacrylate (e.g. SR295 available from Sartomer Company, Inc.), ethoxylated pentaerythritol tetraacrylate (e.g. SR494 available from Sartomer Company, Inc.), and dipentaerythritol pentaacrylate (e.g. Photomer 4399 available from IGM Resins; and SR399 available from Sartomer Company, Inc.); isocyanurate polyacrylates formed by reacting an appropriate functional isocyanurate with an acrylic acid or acryloyl chloride, such as tris-(2-hydroxyethyl)isocyanurate triacrylate (e.g. SR368 available from Sartomer Company, Inc.) and tris-(2-hydroxyethyl)isocyanurate diacrylate; alcohol polyacrylates with and without alkoxylation such as tricyclodecane dimethanol diacrylate (e.g. CD406 available from Sartomer Company, Inc.), alkoxylated hexanediol diacrylate (e.g. CD564 available from Sartomer Company, Inc.), tripropylene glycol diacrylate (e.g. SR306 available from Sartomer Company, Inc.) and ethoxylated polyethylene glycol diacrylate with a degree of ethoxylation being 2 or greater, preferably ranging from about 2 to 30; epoxy acrylates formed by adding acrylate to bisphenol A diglycidylether and the like (e.g. Photomer 3016 available from IGM Resins); and single and multi-ring cyclic aromatic or non-aromatic polyacrylates such as dicyclopentadiene diacrylate.

A multifunctional radiation-curable monomer may be present in the primary layer coating composition at a concentration from 0.05-15 wt %, or from 0.1-10 wt %, or from 0.5-10 wt %, or from 1-5 wt %, or from 1-10 wt %, or from 1-20 wt %, or from 1-50 wt %, or from 2-8 wt %, or from 5-40 wt %, or from 10-30 wt %, or from 20-30 wt %.

It may also be desirable to use certain amounts of monofunctional ethylenically unsaturated monomer diluents, which can be introduced to influence the degree to which the cured product absorbs water, adheres to other coating materials, or behaves under stress. Exemplary monofunctional ethylenically unsaturated monomer diluents include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate (e.g. SR440 available from Sartomer Company, Inc. and Ageflex FA8 available from CPS Chemical Co.), 2-ethylhexyl acrylate, nonyl acrylate, decyl acrylate, isodecyl acrylate (e.g. SR395 available from Sartomer Company, Inc.; and Ageflex FA10 available from CPS Chemical Co.), undecyl acrylate, dodecyl acrylate, tridecyl acrylate (e.g. SR489 available from Sartomer Company, Inc.), lauryl acrylate (e.g. SR335 available from Sartomer Company, Inc., Ageflex FA12 available from CPS Chemical Co. (Old Bridge, N.J.), and Photomer 4812 available from IGM Resins), octadecyl acrylate, and stearyl acrylate (e.g. SR257 available from Sartomer Company, Inc.); aminoalkyl acrylates such as dimethylaminoethyl acrylate, diethylaminoethyl acrylate, and 7-amino-3,7-dimethyloctyl acrylate; alkoxyalkyl acrylates such as butoxyethyl acrylate, phenoxyethyl acrylate (e.g. SR339 available from Sartomer Company, Inc., Ageflex PEA available from CPS Chemical Co., and Photomer 4035 available from IGM Resins), phenoxyglycidyl acrylate (e.g. CN131 available from Sartomer Company, Inc.), lauryloxyglycidyl acrylate (e.g. CN130 available from Sartomer Company, Inc.), and ethoxyethoxyethyl acrylate (e.g. SR256 available from Sartomer Company, Inc.); single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g. SR423 and SR506 available from Sartomer Company, Inc., and Ageflex IBOA available from CPS Chemical Co.), tetrahydrofurfuryl acrylate (e.g. SR285 available from Sartomer Company, Inc.), caprolactone acrylate (e.g. SR495 available from Sartomer Company, Inc.; and Tone M100 available from Union Carbide Company, Danbury, Conn.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4) nonylphenol acrylate (e.g. Photomer 4003 available from IGM Resins; and SR504 available from Sartomer Company, Inc.) and propoxylatednonylphenol acrylate (e.g. Photomer 4960 available from IGM Resins); acrylamides such as diacetone acrylamide, isobutoxymethyl acrylamide, N,N'-dimethyl-aminopropyl acrylamide, N,N-dimethyl acrylamide, N,N-diethyl acrylamide, and t-octyl acrylamide; vinylic compounds such as N-vinylpyrrolidone and N-vinylcaprolactam (both available from Ashland Inc., Covington, Ky.); and acid esters such as maleic acid ester and fumaric acid ester.

The curable monomer diluent can include a single diluent component, or combinations of two or more monomer diluent components. The curable monomer diluent(s) is (are collectively) typically present in the primary layer coating composition in amounts of about 10 wt % to about 60 wt %, more preferably between about 20 wt % to about 50 wt %, and most preferably between about 25 wt % to about 45 wt %.

The radiation-curable component of the primary layer coating composition may include an N-vinyl amide such as an N-vinyl lactam, or N-vinyl pyrrolidinone, or N-vinyl caprolactam. The N-vinyl amide monomer may be present in the primary layer composition at a concentration from 0.1 wt %-40 wt %, or from 2 wt %-10 wt %.

The primary layer coating composition may include one or more monofunctional (meth)acrylate monomers in an amount from 5 wt %-95 wt %, or from 0 wt %-75 wt %, or from 40 wt %-65 wt %. The primary coating composition may include one or more monofunctional aliphatic epoxy (meth)acrylate monomers in an amount from 5 wt %-40 wt %, or from 10 wt %-30 wt %.

A monofunctional radiation-curable monomer may be present in the primary layer coating composition at a concentration from 10 wt %-60 wt %, or from 10 wt %-30 wt %, or from 30 wt %-60 wt %, or from 40 wt %-80 wt %, or from 60 wt %-80 wt %. The radiation-curable coating composition may include one or more monofunctional (meth)acrylate monomers in an amount from 5 wt %-95 wt %, or from 0 wt %-75 wt %, or from 40 wt %-65 wt %. The radiation-curable coating composition may include one or more monofunctional aliphatic epoxy (meth)acrylate monomers in an amount from 5 wt %-40 wt %, or from 10 wt %-30 wt %.

The total monomer content of the primary layer coating composition may be in the range from 5 wt %-95 wt %, or in the range from 20 wt %-95 wt %, or in the range from 40 wt %-95 wt %, or in the range from 60 wt %-95 wt %, or in the range from 40 wt %-85 wt %, or in the range from 60 wt %-85 wt %, or in the range from 30 wt %-75 wt %, or in the range from 40 wt % and 65 wt %.

The radiation-curable component of the primary layer composition may include a radiation-curable monofunctional or multifunctional oligomer. The oligomer may be a (meth)acrylate-terminated oligomer. The oligomer may include polyether acrylates (e.g., GENOMER 3456, available from Rahn USA (Aurora, Ill.)), polyester acrylates (e.g., EBECRYL 80, 584 and 657, available from Cytec Industries Inc. (Woodland Park, N.J.)), or polyol acrylates. The oligomer may be a di(meth)acrylate, tri(meth)acrylate, tetra(meth)acrylate, or higher (meth)acrylate. Polyol (meth)acrylates may include polyalkoxy(meth)acrylates or polyol (meth)acrylates. Examples include polyethylene glycol diacrylate and polypropylene glycol diacrylate. The monofunctional or multifunctional oligomer may lack urethane groups, urea groups, isocyanate groups, and/or hydrogen-donor groups.

In certain embodiments, the radiation-curable oligomer may include one or more polyols that contain two or more $\alpha,\beta$-unsaturated ester, amide, imide, or vinyl ether groups, or combinations thereof. Exemplary classes of these polyol-containing oligomers include, without limitation, polyol acrylates, polyol methacrylates, polyol maleates, polyol fumarates, polyol acrylamides, polyol maleimides or polyol vinyl ethers comprising more than one acrylate, methacrylate, maleate, fumarate, acrylamide, maleimide or vinyl ether group. The polyol moiety can be a polyether polyol, a polyester polyol, a polycarbonate polyol, or a hydrocarbon polyol.

The total radiation-curable oligomer content of the primary coating composition may be less than 20 wt %, or less than 15 wt %, or less than 10 wt %, or less than 5 wt %, or less than 3 wt %, or between about 0.5 wt % and about 25 wt %, or between about 1 wt % and about 15 wt %, or between about 2 wt % and about 10 wt %. In one embodiment, the primary coating composition is free of radiation-curable oligomers.

Suitable photoinitiators and optional additives include those described hereinabove for the radiation-curable and secondary layer coating compositions.

Young's modulus for the primary layer is specified herein as the Young's modulus of cured samples of the primary layer composition configured as thin films. Wet films of the primary layer composition were cast on silicone release paper with the aid of a draw-down box having a gap thickness of about 0.005". The wet films were cured with a UV dose of 1.2 J/cm$^2$ (measured over a wavelength range of 225-424 nm by a Light Bug model IL490 from International Light) by a Fusion Systems UV curing apparatus with a 600 W/in D-bulb (50% Power and approximately 12 ft/min belt speed) to yield the primary layer configured in film form. Cured film thickness about 80 µm (0.0031").

The primary layer films were allowed to age (23° C., 50% relative humidity) for at least 16 hours prior to testing. Primary layer film samples were cut to specified dimensions of 12.5 cm×13 mm using a cutting template and a scalpel. Young's modulus was measured on the primary layer film samples using a MTS Sintech tensile tester. Young's modulus is defined as the steepest slope of the beginning of the stress-strain curve. Primary layer films were tested at an elongation rate of 2.5 cm/min with the initial gauge length of 5.1 cm.

Using the above procedure, the primary layer, when configured as a film of thickness 80 µm, has a Young's modulus less than 1 MPa, or less than 0.75 MPa, or less than 0.50 MPa, or less than 0.35 MPa, or in the range from 0.25 MPa-1.0 MPa, or in the range from 0.30 MPa-0.9 MPa, or in the range from 0.35 MPa-0.8 MPa, or in the range from 0.4 MPa-0.7 MPa.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the illustrated embodiments. Since modifications, combinations, sub-combinations and variations of the disclosed embodiments that incorporate the spirit and substance of the illustrated embodiments may occur to persons skilled in the art, the description should be construed to include everything within the scope of the appended claims and their equivalents.

What is claimed is:

1. A multimode optical fiber comprising:
    a core region, said core region having an outer radius $r_1$ in the range from 10 µm to 20 µm, and a relative refractive index profile $\Delta_1(r)$ with maximum value $\Delta_{1max}$ defined by the relationship:

$$\Delta_1(r) = \Delta_{1max}\left[1 - \left[\frac{r}{r_1}\right]^\alpha\right]$$

where r is a radial coordinate relative to a centerline of the multimode optical fiber and $\alpha$ has a value in the range from 1.8-3.0; and
    a cladding, said cladding having an outer radius $r_4$ in the range from 35 µm to 60 µm and a relative refractive index $\Delta_4$ in the range from −0.1% to 0.1%; and
    a coating surrounding said cladding, said coating having an outer radius $r_5$ less than 100 µm and a thickness less than 55 µm, said coating comprising a primary layer surrounded by a secondary layer, said secondary layer having a Young's modulus greater than 1200 MPa;
    wherein said core region and said cladding form a waveguide that supports a fundamental mode and at least one higher order mode at 1310 nm and said multimode optical fiber has an effective modal bandwidth at 1310 nm of at least 1.5 GHz-km and a numerical aperture greater than 0.22.

2. The multimode optical fiber of claim 1, wherein said outer radius $r_1$ is in the range from 13 µm to 17 µm.

3. The multimode optical fiber of claim 1, wherein said cladding includes a depressed index cladding region surrounding said core region and an outer cladding region surrounding said depressed index cladding region, said depressed index cladding region having an inner radius in the range from 10 µm to 20 µm, an outer radius $r_3$ in the range from 14 μm to 24 μm, and a relative refractive index $\Delta_3$ in the range from −0.8% to −0.1%.

4. The multimode optical fiber of claim 3, wherein said depressed index cladding region has an inner radius in the range from 13 μm to 18 μm.

5. The multimode optical fiber of claim 1, wherein said effective modal bandwidth at 1310 nm is at least 4 GHz-km.

6. The multimode optical fiber of claim 1, wherein said multimode optical fiber has a mode field diameter for the LP01 mode at 1310 nm between 8.8 μm and 9.6 μm.

7. The multimode optical fiber of claim 1, wherein said cladding has an outer radius $r_4$ in the range from 35 μm to 45 μm.

8. The multimode optical fiber of claim 1, wherein said coating has an outer radius $r_5$ less than 90 μm.

9. A multimode optical fiber comprising:
a core region, said core region having an outer radius $r_1$ in the range from 10 μm to 20 μm, and a relative refractive index profile $\Delta_1(r)$ with maximum value $\Delta_{1max}$ defined by the relationship:

$$\Delta_1(r) = \Delta_{1max}\left[1 - \left[\frac{r}{r_1}\right]^\alpha\right]$$

where r is a radial coordinate relative to a centerline of the multimode optical fiber and $\alpha$ has a value in the range from 1.8-3.0; and
a cladding, said cladding having an outer radius $r_4$ in the range from 35 μm to 60 μm and a relative refractive index $\Delta_4$ in the range from −0.1% to 0.1%; and
a coating surrounding said cladding, said coating having an outer radius $r_5$ less than 100 μm and a thickness less than 55 μm, said coating comprising a primary layer surrounded by a secondary layer, said secondary layer having a Young's modulus greater than 1200 MPa;
wherein said core region and said cladding form a waveguide that supports a fundamental mode and at least one higher order mode at 1310 nm and said multimode optical fiber has an effective modal bandwidth at 850 nm of at least 1.5 GHz-km and a numerical aperture greater than 0.22.

10. A multimode optical fiber comprising:
a core region, said core region having an outer radius $r_1$ in the range from 18 μm to 22 μm, and a relative refractive index profile $\Delta_1(r)$ with maximum value $\Delta_{1max}$ defined by the relationship:

$$\Delta_1(r) = \Delta_{1max}\left[1 - \left[\frac{r}{r_1}\right]^\alpha\right]$$

where r is a radial coordinate relative to a centerline of the multimode optical fiber and $\alpha$ has a value in the range from 1.8-3.0; and
a cladding, said cladding having an outer radius $r_4$ in the range from 35 μm to 60 μm and a relative refractive index $\Delta_4$ in the range from −0.1% to 0.1%; and
a coating surrounding said cladding, said coating having an outer radius $r_5$ less than 100 μm and a thickness less than 55 μm, said coating comprising a primary layer surrounded by a secondary layer, said secondary layer having a Young's modulus greater than 1200 MPa;
wherein said core region and said cladding form a waveguide that supports a fundamental mode and at least one higher order mode at 1310 nm and said multimode optical fiber has an effective modal bandwidth at 1310 nm of at least 1.5 GHz-km and a numerical aperture in the range from 0.18 to 0.24.

11. A multimode optical fiber comprising:
a core region, said core region having an outer radius $r_1$ in the range from 18 μm to 22 μm, and a relative refractive index profile $\Delta_1(r)$ with maximum value $\Delta_{1max}$ defined by the relationship:

$$\Delta_1(r) = \Delta_{1max}\left[1 - \left[\frac{r}{r_1}\right]^\alpha\right]$$

where r is a radial coordinate relative to a centerline of the multimode optical fiber and $\alpha$ has a value in the range from 1.8-3.0; and
a cladding, said cladding having an outer radius $r_4$ in the range from 35 μm to 60 μm and a relative refractive index $\Delta_4$ in the range from −0.1% to 0.1%; and
a coating surrounding said cladding, said coating having an outer radius $r_5$ less than 100 μm and a thickness less than 55 μm, said coating comprising a primary layer surrounded by a secondary layer, said secondary layer having a Young's modulus greater than 1200 MPa;
wherein said core region and said cladding form a waveguide that supports a fundamental mode and at least one higher order mode at 1310 nm and said multimode optical fiber has an effective modal bandwidth at 850 nm of at least 1.5 GHz-km and a numerical aperture in the range from 0.18 to 0.24.

12. An optical data link comprising:
a transmitter, said transmitter including a light source, said light source providing light; and
a first multimode optical fiber operably connected to said transmitter, said first multimode optical fiber receiving said light from said light source, said first multimode optical fiber comprising:
a core region, said core region having an outer radius $r_1$ in the range from 18 μm to 22 μm, and a relative refractive index profile $\Delta_1(r)$ with maximum value $\Delta_{1max}$ defined by the relationship:

$$\Delta_1(r) = \Delta_{1max}\left[1 - \left[\frac{r}{r_1}\right]^\alpha\right]$$

where r is a radial coordinate relative to a centerline of the multimode optical fiber and $\alpha$ has a value in the range from 1.8-3.0; and
a cladding, said cladding having an outer radius $r_4$ in the range from 35 μm to 60 μm and a relative refractive index $\Delta_4$ in the range from −0.1% to 0.1%; and
a coating surrounding said cladding, said coating having an outer radius $r_5$ less than 100 μm and a thickness less than 55 μm, said coating comprising a primary layer surrounded by a secondary layer, said secondary layer having a Young's modulus greater than 1200 MPa;
wherein said core region and said cladding form a waveguide that supports a fundamental mode and at least one higher order mode at 1310 nm and said first multimode optical fiber has an effective modal bandwidth at 1310 nm of at least 1.5 GHz-km and a numerical aperture in the range from 0.18 to 0.24.

13. The optical data link of claim 12, wherein said light source is a silicon photonics laser or a vertical cavity surface emitting laser.

14. The optical data link of claim 12, further comprising a transmission fiber operably connected to said first multimode optical fiber, said transmission fiber receiving said light from said first multimode optical fiber.

15. The optical data link of claim 14, further comprising a second multimode optical fiber operably connected to said transmission fiber, said second multimode optical fiber receiving said light from said transmission fiber, said second multimode optical fiber comprising:

a core region, said core region having an outer radius $r_1$ in the range from 18 μm to 22 μm, and a relative refractive index profile $\Delta_1(r)$ with maximum value $\Delta_{1max}$ defined by the relationship:

$$\Delta_1(r) = \Delta_{1max}\left[1 - \left[\frac{r}{r_1}\right]^\alpha\right]$$

where r is a radial coordinate relative to a centerline of the multimode optical fiber and α has a value in the range from 1.8-3.0; and a cladding, said cladding having an outer radius $r_4$ in the range from 35 μm to 60 μm and a relative refractive index $\Delta_4$ in the range from −0.1% to 0.1%; and a coating surrounding said cladding, said coating having an outer radius $r_5$ less than 100 μm and a thickness less than 55 μm, said coating comprising a primary layer surrounded by a secondary layer, said secondary layer having a Young's modulus greater than 1200 MPa;

wherein said core region and said cladding form a waveguide that supports a fundamental mode and at least one higher order mode at 1310 nm and said second multimode optical fiber has an effective modal bandwidth at 1310 nm of at least 1.5 GHz-km and a numerical aperture in the range from 0.18 to 0.24.

16. The optical data link of claim 15, further comprising a receiver, said receiver receiving said light from said second multimode optical fiber, said receiver including a detector for detecting said light.

17. The optical data link of claim 15, wherein said cladding of said first multimode optical fiber includes a depressed index cladding region surrounding said core region and an outer cladding region surrounding said depressed index cladding region, said depressed index cladding region having an inner radius in the range from 18 μm to 23 μm, an outer radius $r_3$ in the range from 20 μm to 28 μm, and a relative refractive index $\Delta_3$ in the range from −0.8% to −0.1%.

18. The optical data link of claim 17, wherein said cladding of said second multimode optical fiber includes a depressed index cladding region surrounding said core region and an outer cladding region surrounding said depressed index cladding region, said depressed index cladding region having an inner radius in the range from 18 μm to 23 μm, an outer radius $r_3$ in the range from 20 μm to 28 μm, and a relative refractive index $\Delta_3$ in the range from −0.8% to −0.1%.

19. An optical data link comprising:

a transmitter, said transmitter including a light source, said light source providing light; and a first multimode optical fiber operably connected to said transmitter, said first multimode optical fiber receiving said light from said light source, said first multimode optical fiber comprising:

a core region, said core region having an outer radius $r_1$ in the range from 18 μm to 22 μm, and a relative refractive index profile $\Delta_1(r)$ with maximum value $\Delta_{1max}$ defined by the relationship:

$$\Delta_1(r) = \Delta_{1max}\left[1 - \left[\frac{r}{r_1}\right]^\alpha\right]$$

where r is a radial coordinate relative to a centerline of the multimode optical fiber and α has a value in the range from 1.8-3.0; and a cladding, said cladding having an outer radius $r_4$ in the range from 35 μm to 60 μm and a relative refractive index $\Delta_4$ in the range from −0.1% to 0.1%; and a coating surrounding said cladding, said coating having an outer radius $r_5$ less than 100 μm and a thickness less than 55 μm, said coating comprising a primary layer surrounded by a secondary layer, said secondary layer having a Young's modulus greater than 1200 MPa;

wherein said core region and said cladding form a waveguide that supports a fundamental mode and at least one higher order mode at 1310 nm and said first multimode optical fiber has an effective modal bandwidth at 850 nm of at least 1.5 GHz-km and a numerical aperture in the range from 0.18 to 0.24.

20. An optical data link comprising:

a transmitter, said transmitter including a light source, said light source providing light; and a first multimode optical fiber operably connected to said transmitter, said first multimode optical fiber receiving said light from said light source, said first multimode optical fiber comprising:

a core region, said core region having an outer radius $r_1$ in the range from 18 μm to 22 μm, and a relative refractive index profile $\Delta_1(r)$ with maximum value $\Delta_{1max}$ defined by the relationship:

$$\Delta_1(r) = \Delta_{1max}\left[1 - \left[\frac{r}{r_1}\right]^\alpha\right]$$

where r is a radial coordinate relative to a centerline of the multimode optical fiber and α has a value in the range from 1.8-3.0; and a cladding, said cladding having an outer radius $r_4$ in the range from 35 μm to 60 μm and a relative refractive index $\Delta_4$ in the range from −0.1% to 0.1%; and a coating surrounding said cladding, said coating having an outer radius $r_5$ less than 100 μm and a thickness less than 55 μm, said coating comprising a primary layer surrounded by a secondary layer, said secondary layer having a Young's modulus greater than 1200 MPa;

wherein said core region and said cladding form a waveguide that supports a fundamental mode and at least one higher order mode at 1310 nm and said first multimode optical fiber has an effective modal bandwidth at 1064 nm of at least 1.5 GHz-km and a numerical aperture in the range from 0.18 to 0.24.

* * * * *